US011310726B2

(12) United States Patent
Ratnam et al.

(10) Patent No.: US 11,310,726 B2
(45) Date of Patent: Apr. 19, 2022

(54) RESOURCE ALLOCATION AND TIMING HANDLING IN CELLULAR MESH NETWORKS

(71) Applicant: Samsung Electronics Co., Ltd., Suwon-si (KR)

(72) Inventors: Vishnu Vardhan Ratnam, Plano, TX (US); Jeongho Jeon, San Jose, CA (US); Joonyoung Cho, Portland, OR (US); Russell Douglas Ford, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 16/821,735

(22) Filed: Mar. 17, 2020

(65) Prior Publication Data

US 2020/0305068 A1    Sep. 24, 2020

Related U.S. Application Data

(60) Provisional application No. 62/820,349, filed on Mar. 19, 2019.

(51) Int. Cl.
*H04W 4/00* (2018.01)
*H04W 48/16* (2009.01)
(Continued)

(52) U.S. Cl.
CPC ......... *H04W 48/16* (2013.01); *H04W 56/009* (2013.01); *H04W 56/0045* (2013.01); *H04W 72/042* (2013.01); *H04W 72/0446* (2013.01)

(58) Field of Classification Search
CPC  H04B 1/7075; H04W 48/16; H04W 56/0045; H04W 56/009; H04W 72/042
See application file for complete search history.

(56) References Cited

U.S. PATENT DOCUMENTS 9,806,777 B1    10/2017  Doostnejad et al.
2015/0271723 A1*  9/2015  Yang ................. H04W 36/0077
                                                    455/436

(Continued)

FOREIGN PATENT DOCUMENTS

WO    2017004253 A1    1/2017
WO    2018229078 A1    12/2018

OTHER PUBLICATIONS

Ericsson, "IAB resource allocation and multiplexing", 3GPP TSG-RAN WG1 Meeting #95, R1-1813566, Nov. 2018, 6 pages.

(Continued)

*Primary Examiner* — Siren Wei

(57) ABSTRACT

Methods and apparatuses for resource allocation and timing handling in a wireless communication network. A method of operating a base station (BS) in the wireless communication network includes communicating with at least a first parent BS of the BS in the wireless communication network according to a slot pattern of the BS. The slot pattern indicates slots on which the BS can receive and slots on which the BS can transmit. The method further includes receiving discovery information about a neighbor BS in the wireless communication network and determining whether to add the neighbor BS as a second parent BS of the BS based on the discovery information about the neighbor BS. The method further includes determining a resource allocation to the second parent BS based on the slot pattern of the BS and communicating with the second parent BS based on the determined resource allocation.

20 Claims, 18 Drawing Sheets

(51) Int. Cl.
*H04W 72/04* (2009.01)
*H04W 56/00* (2009.01)

(56) References Cited

U.S. PATENT DOCUMENTS

| | | | |
|---|---|---|---|
| 2016/0050006 A1 | 2/2016 | Ko et al. | |
| 2017/0099090 A1 | 4/2017 | Liu et al. | |
| 2018/0302131 A1 | 10/2018 | Zhao et al. | |
| 2019/0110266 A1 | 4/2019 | Abedini et al. | |
| 2019/0349871 A1* | 11/2019 | Ghosh | H04W 56/001 |
| 2020/0045563 A1* | 2/2020 | Luo | H04W 52/367 |
| 2020/0052775 A1* | 2/2020 | Nam | H04B 7/15542 |
| 2020/0145991 A1* | 5/2020 | Abedini | H04W 72/0426 |
| 2020/0145993 A1* | 5/2020 | Abedini | H04L 5/0032 |

OTHER PUBLICATIONS

Qualcomm, "[Draft] LS on initial access SSB periodicity assumption for IAB MT", 3GPP TSG RAN WG1 Meeting #96, R1-1903692, Feb. 2019, 1 page.

AT&T, "Summary of 7.2.3.5 Mechanism to support the "case-1" OTA timing alignment", 3GPP TSG RAN WG1 Meeting Ad-Hoc Meeting, R1901417, Jan. 2019, 4 pages.

International Search Report and Written Opinion of the International Searching Authority in connection with International Application No. PCT/KR2020/003868 dated Jun. 29, 2020, 9 pages.

International Search Report and Written Opinion of the International Searching Authority in connection with International Application No. PCT/KR2020/003763 dated Jul. 2, 2020, 10 pages.

3GPP TR 38.874 1.0.0 (Dec. 2018), Technical Report, 3rd Generation Partnership Project; Technical Specification Group Radio Access Network; Study on Integrated Access and Backhaul; (Release 15), Dec. 2018, 112 pages.

Huawei et al., "DL transmission timing alignment for IAB," R1-1901534, 3GPP TSG RAN WG1 Meeting #96, Athens, Greece, Feb. 25-Mar. 1, 2019, 6 pages.

Nokia et al., "Mechanisms for resource multiplexing among backhaul and access links," R1-1902433, 3GPP TSG RAN WG1 #96, Athens, Greece, Feb. 25-Mar. 1, 2019, 15 pages.

Qualcomm Incorporated, "IAB Resource Management Framework," R1-1902992, 3GPP TSG RAN WG1 Meeting #96, Athens, Greece, Feb. 25-Mar. 1, 2019, 9 pages.

* cited by examiner

RESOURCE ALLOCATION AND TIMING HANDLING IN CELLULAR MESH NETWORKS

CROSS-REFERENCE TO RELATED APPLICATIONS AND CLAIM OF PRIORITY

The present application claims priority to U.S. Provisional Patent Application No. 62/820,349, filed on Mar. 19, 2019. The content of the above-identified patent document is incorporated herein by reference.

TECHNICAL FIELD

The present application relates generally to wireless communication systems, more specifically, the present disclosure relates to resource allocation and timing handling in wireless communication networks such as cellular mesh networks.

BACKGROUND

A communication system includes a downlink (DL) that conveys signals from transmission points such as base stations (BSs) to reception points such as user equipments (UEs) and an uplink (UL) that conveys signals from transmission points such as UEs to reception points such as BSs. Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage. However, the deployment locations and density of conventional BSs is limited by the availability of expensive fiber backhaul.

SUMMARY

The present disclosure relates to resource allocation and timing handling in wireless communication networks such as cellular mesh networks.

In one embodiment, a method of operating a BS in a wireless communication network is provided. The method includes communicating with at least a first parent BS of the BS in the wireless communication network according to a slot pattern of the BS. The slot pattern indicates slots on which the BS can receive and slots on which the BS can transmit. The method further includes receiving discovery information about a neighbor BS in the wireless communication network and determining whether to add the neighbor BS as a second parent BS of the BS based on the discovery information about the neighbor BS. The method further includes determining a resource allocation to the second parent BS based on the slot pattern of the BS and communicating with the second parent BS based on the determined resource allocation.

In another embodiment, a BS in a wireless communication network is provided. The BS includes a transceiver and a processor operably connected to the transceiver. The transceiver is configured to communicate with at least a first parent BS of the BS in the wireless communication network according to a slot pattern of the BS, the slot pattern indicating slots on which the BS can receive and slots on which the BS can transmit; and receive discovery information about a neighbor BS in the wireless communication network. The processor is configured to determine whether to add the neighbor BS as a second parent BS of the BS based on the discovery information about the neighbor BS and determine a resource allocation to the second parent BS based on the slot pattern of the BS. The transceiver is further configured to communicate with the second parent BS based on the determined resource allocation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

In the present disclosure, the term "shared spectrum" is used in an inclusive manner without the distinction on the shared spectrum and unlicensed spectrum and the term "shared spectrum" also includes not only the currently available spectrums but also spectrums that will be made available in the future. Thus, the term "shared spectrum" should not be interpreted as a limiting factor in determining the scope of the present disclosure.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
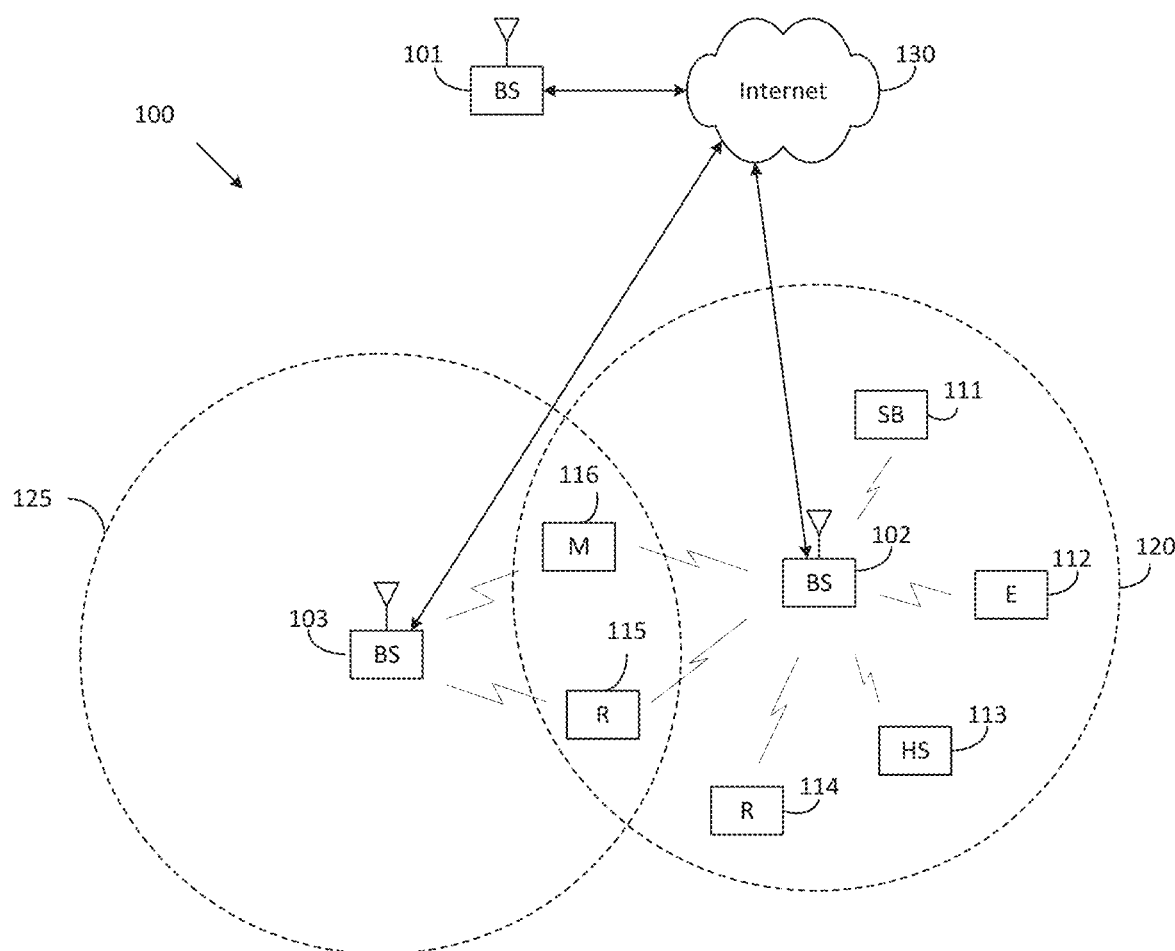
FIG. 1 illustrates an example wireless network according to embodiments of the present disclosure.
Figure 2:
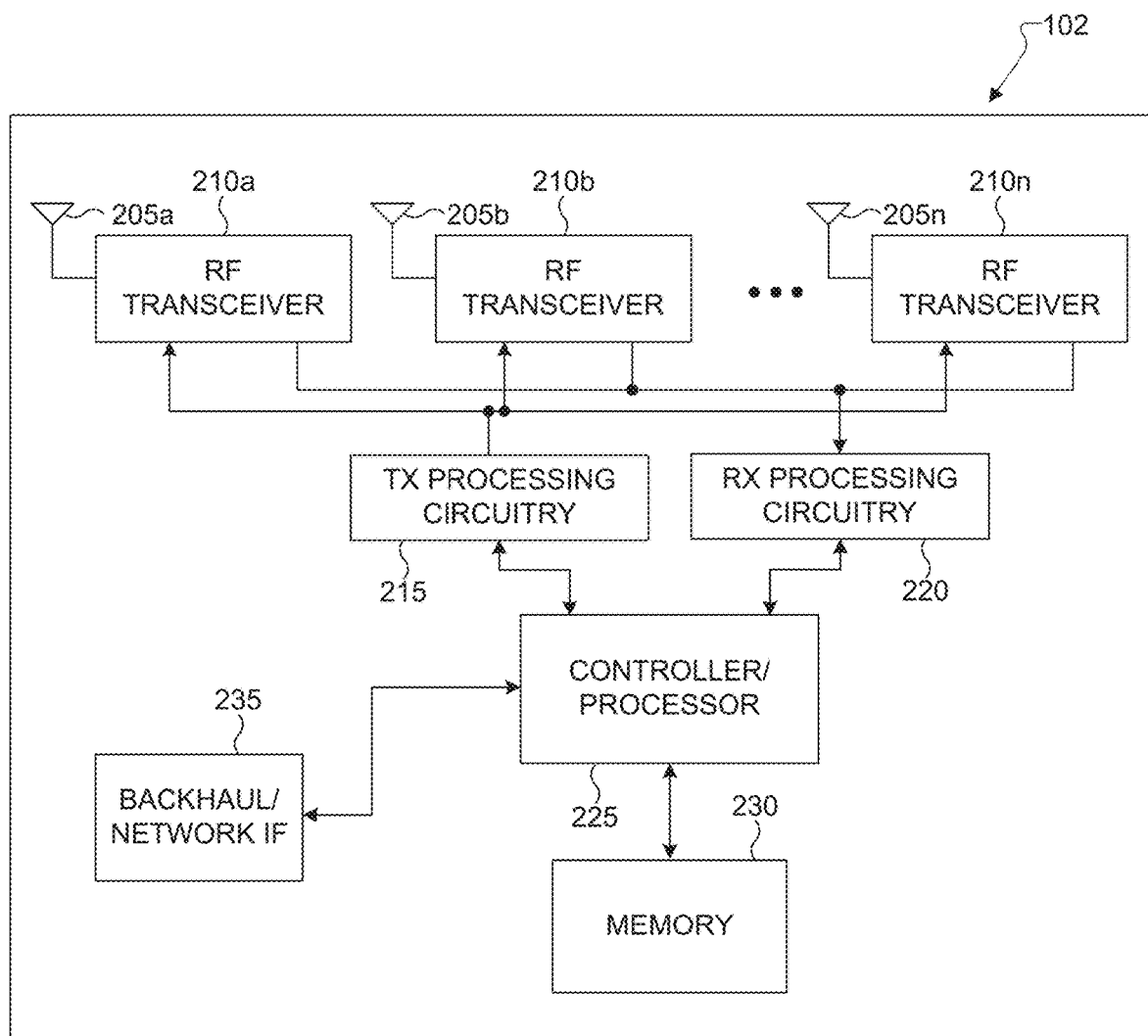
FIG. 2 illustrates an example gNB according to embodiments of the present disclosure.
Figure 3:
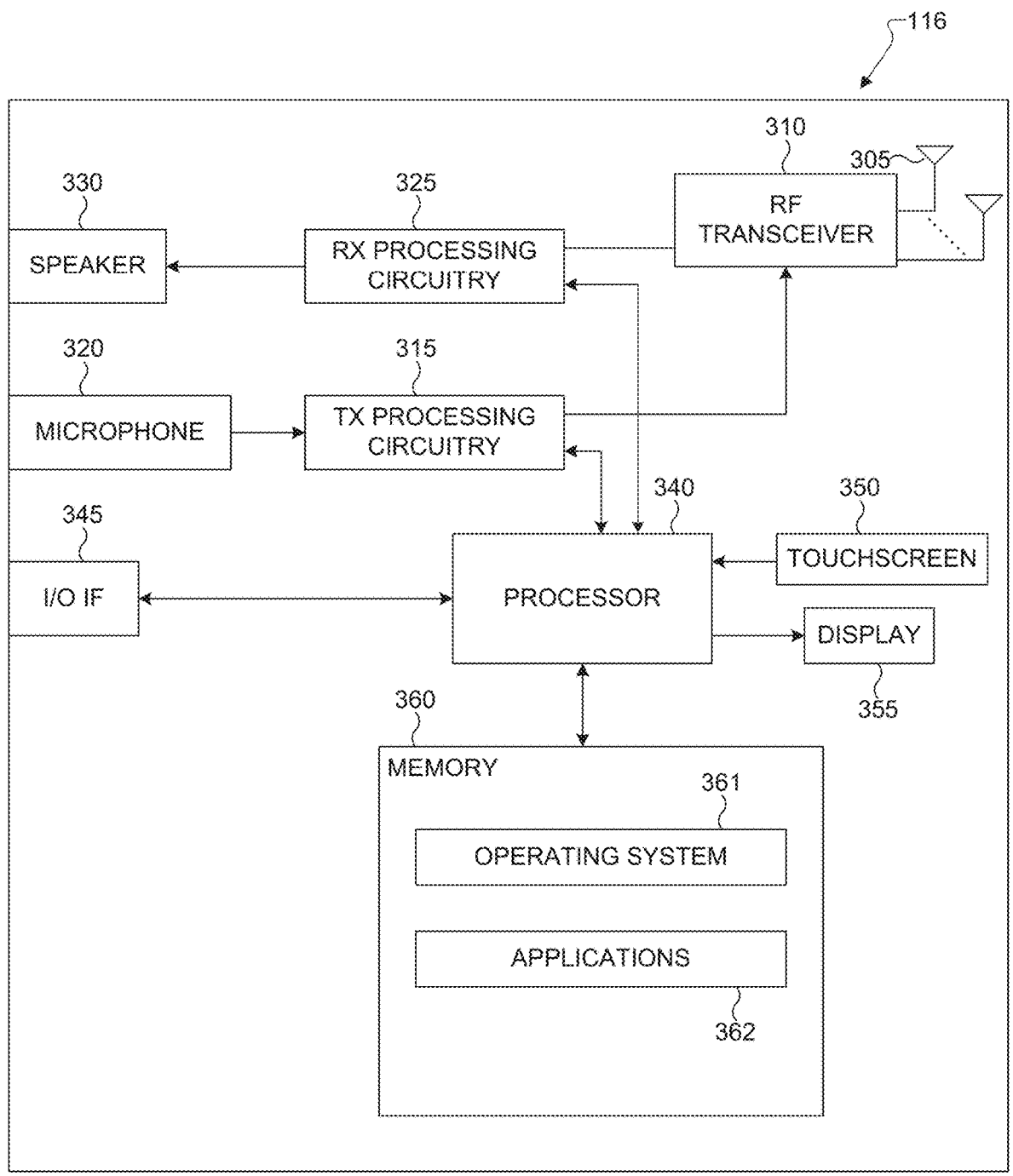
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In various embodiments, the gNBs communicating with each other in a mesh network according to resource allocation and timing handling procedures of the present disclosure. For example, the network 100 can be a mesh network.

The gNB 102 provides wireless broadband access to the network 130 for a first plurality of user equipments (UEs)

within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for communicating with BSs in a mesh network according to resource allocation and timing handling procedures of the present disclosure. In certain embodiments, and one or more of the gNBs 101-103 includes circuitry, programming, or a combination thereof, for efficient resource allocation and timing handling in a cellular mesh network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
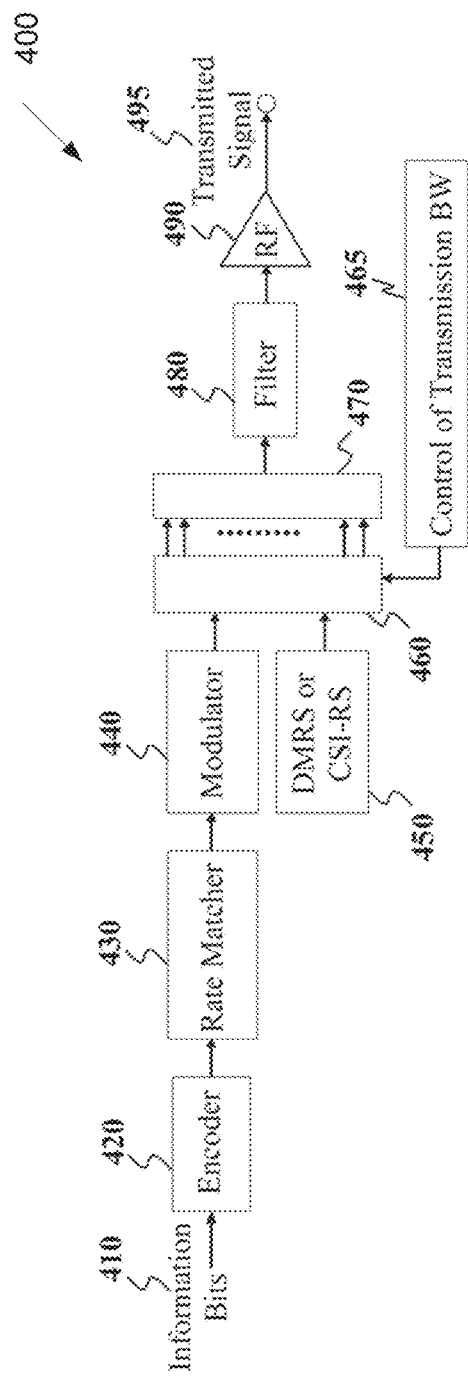
FIG. 4 illustrates an example transmitter structure using OFDM according to embodiments of the present disclosure.

FIG. 4 illustrates an example transmitter structure 400 using OFDM according to embodiments of the present disclosure. For example, the transmitter structure 400 may be implemented in the UE 116 or the gNB 102. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
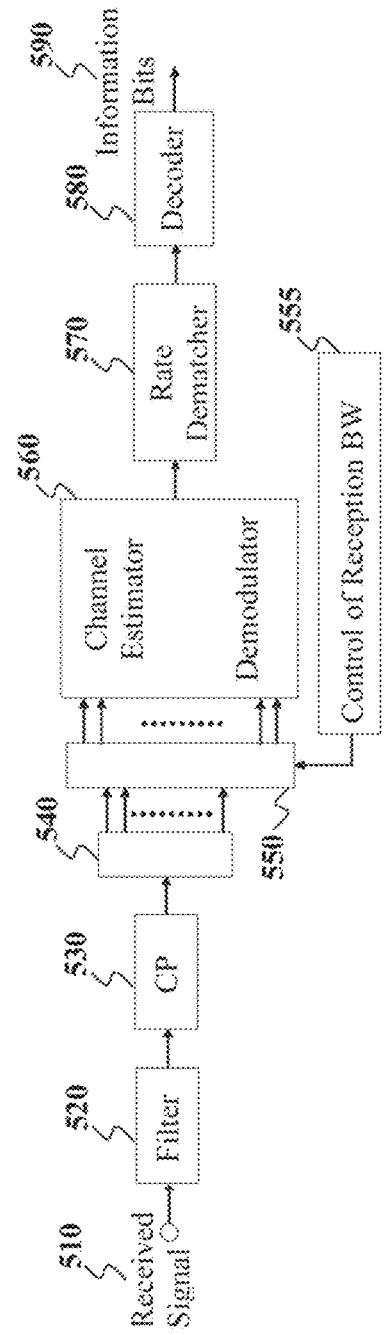
FIG. 5 illustrates an example receiver structure using OFDM according to embodiments of the present disclosure.

FIG. 5 illustrates an example receiver structure 500 using OFDM according to embodiments of the present disclosure. For example, the receiver structure 500 may be implemented in the UE 116 or the gNB 102. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
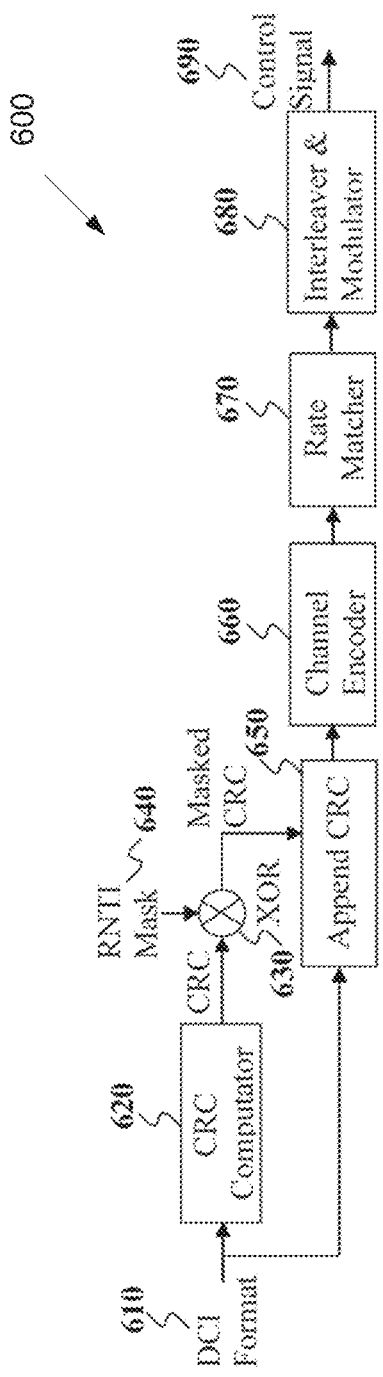
FIG. 6 illustrates an example encoding process for a DCI format according to embodiments of the present disclosure.

FIG. 6 illustrates an example encoding process 600 for a DCI format according to embodiments of the present disclosure. For example, the encoding process 600 may be implemented in the gNB 102. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
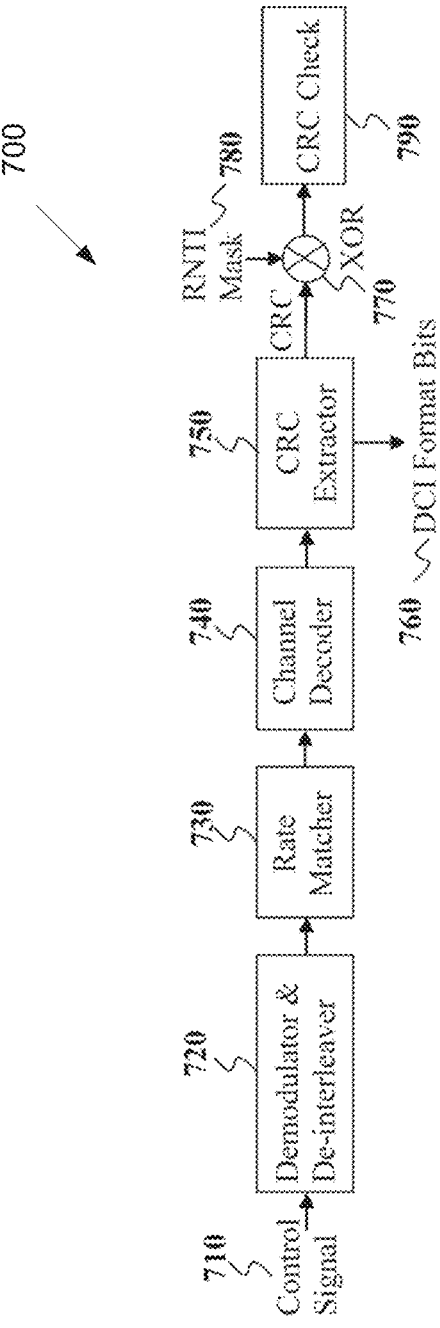
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. For example, the decoding process 700 may be implemented in the UE 116. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (checksum is zero), the DCI format information bits are considered to be valid. When the CRC check does not succeed, the DCI format information bits are considered to be invalid.

Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage.

However, the deployment locations and density of conventional BSs is limited by the availability of expensive fiber backhaul.

Figure 8:
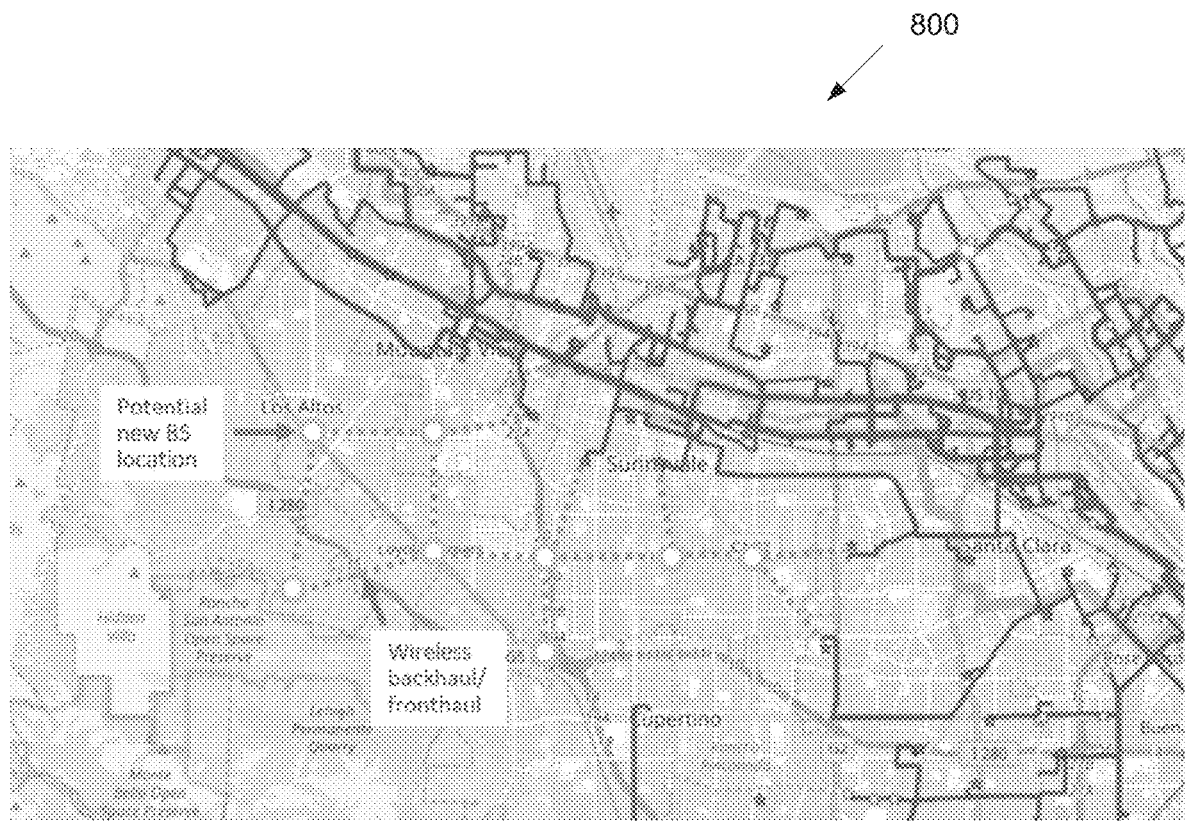
FIG. 8 illustrates an example of fiber and BS deployment according to embodiments of the present disclosure.

FIG. 8 illustrates an example fiber and BS deployment 800 according to embodiments of the present disclosure. The embodiment of the fiber and BS deployment 800 illustrated in FIG. 8 is for illustration only. FIG. 8 does not limit the scope of the present disclosure to any particular implementation.

As an illustration, FIG. 8 shows a typical fiber and BS deployment in an urban area. An effective way to "unleash" the BS deployment from fiber and provide improved coverage and better deployment density without additional expensive fiber deployment, is by using wireless backhaul for the BSs. To be most effective, such BSs may be capable of establishing one or more backhaul paths to the fiber network, with each path encompassing one or more wireless links as illustrated in FIG. 8, i.e., multi-connectivity and multi-hop functionality can be supported. A deployed network with such capabilities is referred to as a wireless mesh network.

Figure 9:
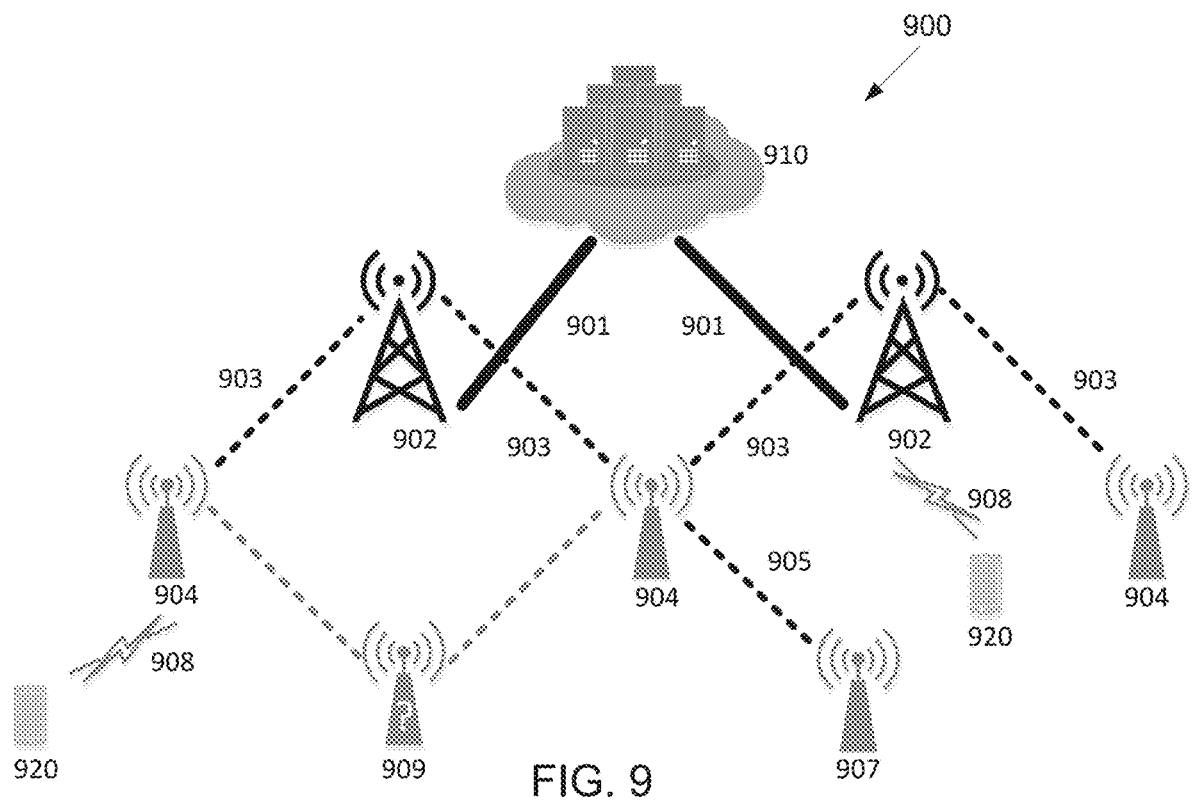
FIG. 9 illustrates an example of a multi-hop wireless backhaul mesh network according to embodiments of the present disclosure.

FIG. 9 illustrates an example multi-hop wireless backhaul mesh network 900 according to embodiments of the present disclosure. The embodiment of the multi-hop wireless backhaul mesh network 900 illustrated in FIG. 9 is for illustration only. FIG. 9 does not limit the scope of the present disclosure to any particular implementation.

An illustrative example of a multi-hop wireless mesh network 900 is provided in FIG. 9. The network 900 includes a plurality of BS 902, 904, 907, and 909, which may be examples of gNB 102, and a plurality of UEs 920, which may be examples of UE 116. Referring to FIG. 9, a gateway BS 902 may be connected to the core network 910 by a fiber/wired backhaul link 901. Similarly, a mesh BS 904 may be connected to a gateway BS 902 via a wireless interface 903, and a mesh BS 907 may be wirelessly connected to a mesh BS 904 via a wireless interface 905. A UE 920 can be connected either to a mesh BS or to a gateway BS via a wireless access link 908. The downlink backhaul traffic to a mesh BS 904 can be routed from the core network 910 to a gateway BS 902 through fiber/wired backhaul interface 901 and then transmitted to the BS 904 (e.g., mesh BS(s)) through the wireless interface 903.

The uplink backhaul traffic from the mesh BS 904 may be transmitted through the wireless interface 903 to the gateway BS 902 and then routed to the core network 910 by the fiber/wired backhaul interface 901. Similarly, the downlink backhaul traffic to the mesh BS 907 may be routed from the core network 910 to the gateway BS 902 via the wired interface 901, and then transmitted via the wireless interface 903 to the mesh BS 904 and then via wireless interface 905 to the mesh BS 907. The immediate previous hop BS that provides a mesh BS/UE connectivity to the core network is referred to as a parent BS. Similarly, a BS which gains access to the core network via a parent BS is referred to as a child BS of the parent BS.

The mesh BSs 904, 907 with already existing single hop (e.g., 903) or the multi-hop (e.g., 903-905) backhaul interface to the gateway BS 902 or the core network 910 is referred to as a connected mesh BS. Similarly, the mesh BS 909 that currently does not have a backhaul interface to the core network 910 is referred to as a new mesh BS. For an in-band operation, the BS-BS backhaul interfaces 903, 905, may re-use the same frequency resource as the BS-UE access links 908, while for out-of-band operation, both backhaul/fronthaul and access link may use different frequency resources. For centralized control case, the fronthaul/backhaul traffic routing decisions for the mesh network may be made by the gateway BS or another entity within the core network. For the decentralized control, each BS may make the fronthaul/backhaul traffic routing decisions by itself.

Unlike in a tree network, a connected BS in a mesh network may be connected with and may simultaneously communicate with multiple parent BSs. As an example, in FIG. 9, mesh BS 904*b* has two parent BSs —902*a* and 902*b* respectively. Such multiple connections may be used, for example, to support multi-path routing or to provide fast/dynamic traffic rerouting. Connections to such multiple parent BSs may either be supported on orthogonal resources via time/frequency division multiplexing (TDM/FDM) or can be supported on the same resources by spatial division multiplexing (SDM) if the child BS has multiple base-band units and multiple antennas. Having such multiple parent BSs may lead to scheduling and/or timing mismatches at the child mesh BS. The present disclosure discusses methods to enable handling connections to multiple parent BSs in a cellular mesh network, that may mitigate the aforementioned issues.

A typical mesh BS may suffer from half duplex constraint, wherein the typical mesh BS cannot receive signals in the same time-frequency resource as when the typical mesh BS is transmitting signals. As a solution to this constraint, time and/or frequency resources for each link may be divided into transmission slots, and the time and/or frequency resources may correspondingly follow a specific "transmission pattern" for these slots: which lists subsets of transmission slots where the BS transmits signals or receives signals. Such a slot pattern may be determined by each mesh BS in a distributed fashion or can be centrally determined by a central processor and communicated to each mesh BS. Furthermore, such a slot pattern can be fixed, adapted at a slow time scale, or can be dynamically adapted at a fast time scale.

As an example of the fixed temporal slot pattern, a mesh BS may transmit on odd time slots and receive on even time slots if the mesh BS has an odd hop count to the to a gateway BS and a mesh BS may transmit on even time slots and receive on odd time if the mesh BS has even hop count to a gateway BS. This example is illustrated in FIG. 10.

Figure 10:
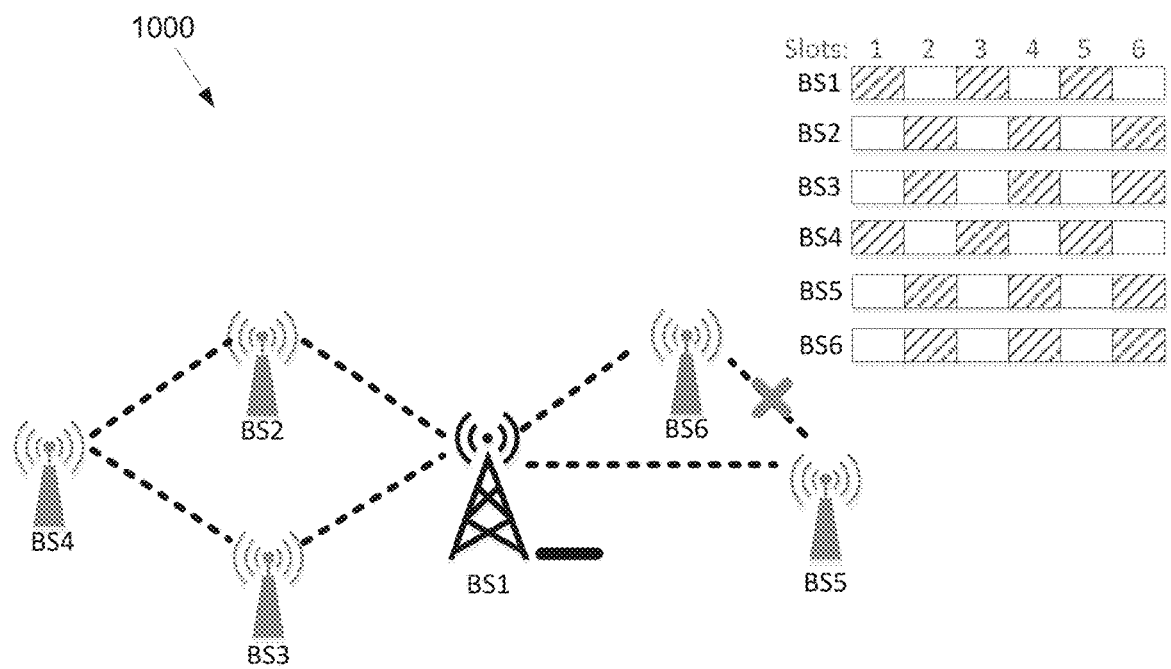
FIG. 10 illustrates an example of temporal slot pattern assignment in a mesh network according to embodiments of the present disclosure.

FIG. 10 illustrates an example of temporal slot pattern assignment in a mesh network 1000 according to embodiments of the present disclosure. For example, the mesh network 1000 may be an example of one implementation of the mesh network 900 in FIG. 9. The embodiment of the temporal slot pattern assignment illustrated in FIG. 10 is for illustration only. FIG. 10 does not limit the scope of the present disclosure to any particular implementation.

In one embodiment, the temporal slot pattern assignment may be implemented at base stations (e.g., 101-103 as illustrated in FIG. 1) that may be a gateway BS or a mesh BS as illustrated in FIG. 9. As illustrated in FIG. 10, shaded slots stand for RX and unshaded slots stand for TX.

Note that each time (or frequency) domain slot may itself contain several different frequency (or time) resources which can be allocated to one or more wireless links. For example, a BS1 in FIG. 10 may communicate with a BS2 on a slot 1 at frequency $f_1$, with a BS2 on frequency $f_2$ and a BS 6 on frequency $f_3$. For frequency domain slots, separate base-band units and/or intermediate frequency units may be required to simultaneously transmit and receive signals (in time), and sufficient spacing between the slots may be required to isolate these transmit and receive signals.

One example is the frequency division duplexing (FDD) in LTE, where a sufficient guard band is provided between the transmit and receive frequency bands (slots). For time domain slots, the same base-band unit can be shared by both transmit and receive signals, and a guard time may be required to compensate for timing alignment. One example is the time division duplexing in LTE. For ease of explanation, the time domain slots may be considered, although the present disclosure also directly applies to the case of frequency domain slots. Without loss of generality, one frequency band may also be focused, where the frequency separation may be insufficient to bypass the half duplex constraint via FDD.

In the present disclosure, a generic slot pattern assignment is provided where each time slot may be one of six types: hard transmit (hTx), hard receive (hRx), hard flexible (hFl), soft transmit (sTx), soft receive (sRx) and soft flexible (sFl).

Figure 11:
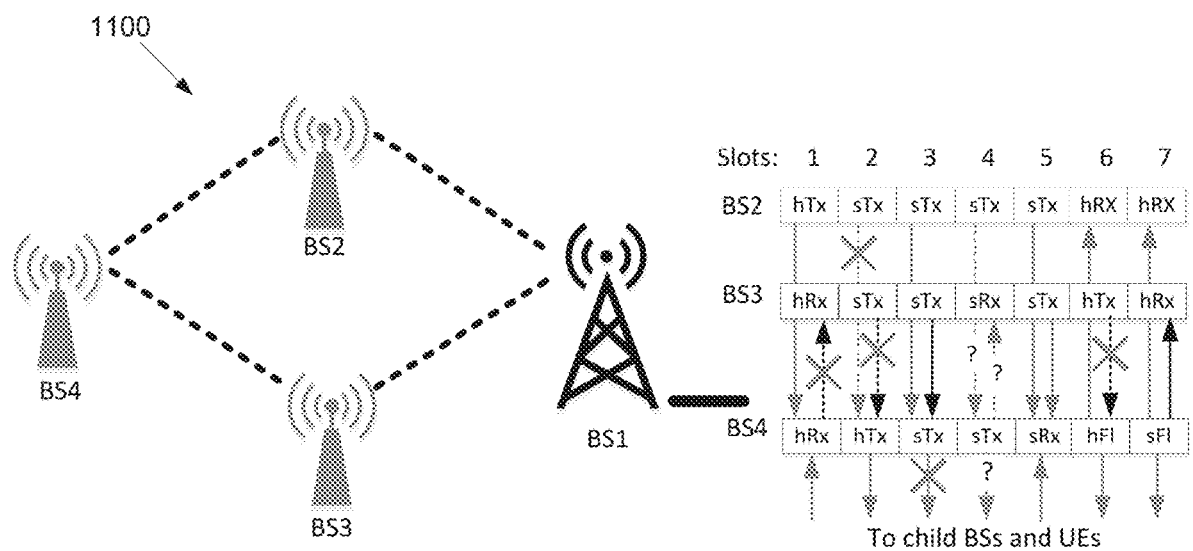
FIG. 11 illustrates an example of hard and soft Tx, Rx and Fl resource assignment and operation in a mesh network according to embodiments of the present disclosure.

FIG. 11 illustrates an example of hard and soft Tx, Rx and Fl resource assignment and operation in a mesh network 1100 according to embodiments of the present disclosure. For example, the mesh network 1100 may be an example of one implementation of the mesh network 900 in FIG. 9. The embodiment of the hard and soft Tx, Rx and Fl resource assignment and operation illustrated in FIG. 11 is for illustration only. FIG. 11 does not limit the scope of the present disclosure to any particular implementation. In one embodiment, hard and soft Tx, Rx and Fl resource assignment and operation may be implemented at base stations (e.g., 101-103 as illustrated in FIG. 1) that may be a gateway BS or a mesh BS as illustrated in FIG. 9.

In one example of hard transmit, these slots are dedicated for transmission (to parent BSs, child BSs and/or access links) and can either be used to transmit signals or remain idle. Decision to use them can be taken without confirming with parent BS(s). This type of resource is illustrated in slot 2 of FIG. 11, where the transmission direction of BS4 is not changed to accommodate for the parents BS2 and BS3.

As illustrated in FIG. 11, the solid arrows represent actual feasible transmissions, while the dashed arrows represent the expected transmission direction at the parent BS, which may not be satisfied due to hard resource constraints at child BS.

In one example of hard receive, these slots are dedicated for receiving signals (from parent BSs, child BSs and/or access links) and can either be used to receive signals or remain idle. Decision to use them can be taken without confirming with parent BS(s). This type of resource is illustrated, for instance, in slot 1 of BS4 in FIG. 11.

In one example of hard flexible, these slots can be used for either transmitting or receiving signals (to/from parent BSs, child BSs and/or access links) and can be used either to transmit, receive or remain idle. Decision on how to use the resource (for TX/RX/idle) can be taken at each BS without confirming with parent BS(s). This type of resource is illustrated in slot 6 of BS4 in FIG. 11.

In one example of soft transmit, these slots are available for transmission (to parent BSs, child BSs and/or access links) conditioned on approval by the parent BS(s). For example, by not giving approval, a parent BS may ask a child BS to stop transmission and instead receive signals from the child BS on this sTx resource. However, with respect to access links and child links, this resource can only be used to transmit signals or remain idle but not to receive signals. This type of resource is illustrated in slot 3 of BS4 in FIG. 11, where the transmission to child links is blocked since approval is not provided from parent BSs: BS2 and/or BS3.

In one example of soft receive, these slots are available for reception (from parent BSs, child BSs and/or access links) conditioned on approval by the parent BS(s). For example, by not giving approval, a parent BS may ask a child BS to stop reception and instead transmit signals to the child BS on this sRx resource. However, with respect to access links and child links, this resource can only be used to receive signals or remain idle but not to transmit signals. This type of resource is illustrated in slot 5 of BS4 in FIG. 11, where approval is provided by the parent BSs: BS2 and BS3.

In one example of soft flexible, these slots are available for either transmission or reception (to/from parent BSs, child BSs and/or access links) conditioned on approval by the parent BS(s). If approval is not given, the parent BS may determine the communication direction on this resource, similar to sTx and sRx resources. However, unlike sTx and sRx, with respect to access links and child links, this resource can be used either to transmit signals, receive signals or remain idle. This type of resource is illustrated in slot 7 of BS4 in FIG. 11, where the direction of communication of BS4 is determined by the parents BS2 and BS3, and all child links adjust accordingly.

Independent of whether the slot pattern is determined in a centralized or a distributed way, the slot patterns used by two parent BSs of a child BS can be different. As an example, multiple parent BSs be connected to the core network via different gateway BSs. As another example, multiple parent BSs may be connected to core network via the same gateway BSs but with each having a different hop count to the gateway, etc.

Note that transmission to both parents can happen on the same time slots, if the corresponding links either support SDM or communicate on different frequency resources. In this case, conflicts may arise among the parents, especially in the scheduling of the soft resources to the child BSs.

As an example, in FIG. 11, consider slot 4 where a BS2 has a sTx slot, a BS3 has an sRx slot and the child BS4 has a sTx slot. In this case, the BS2 may want a BS4 to receive signals while the BS3 may want the BS4 to transmit signals. The following sections disclose embodiments to handle such conflicts in resource allocation.

In one embodiment, a mesh BS may have multiple parent BSs and among the multiple parent BSs, there may be a primary parent BS and one or multiple secondary BSs. As an example, a primary parent BS is the BS through which the control plane of the current mesh BS of interest is traversing.

In another example, primary synchronization, RRC configurations, and/or slot patterns can be obtained/configured by the primary parent BS. A secondary BS can be, in one embodiment, a BS through which only data plane of the current mesh BS of interest is traversing. Synchronization, RRC configurations, and/or slot patterns can be additionally obtained/configured by the secondary parent BS but a child mesh BS may not solely rely on such information from a secondary parent BS.

Figure 12:
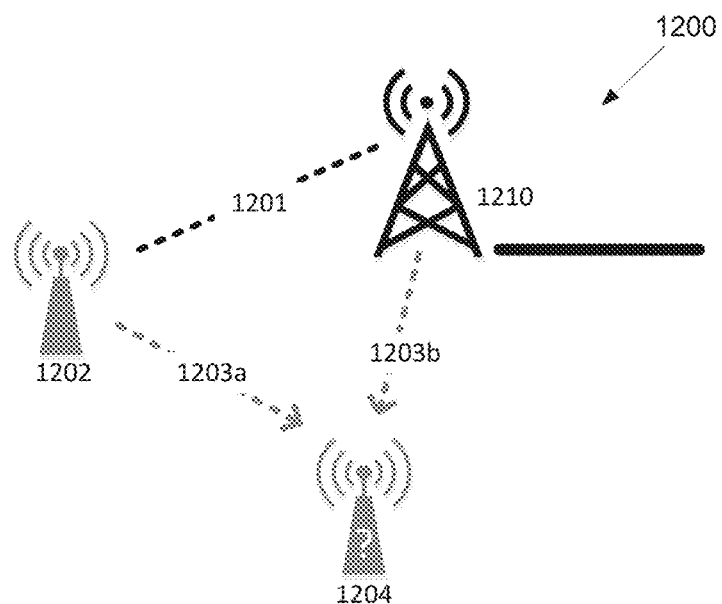
FIG. 12 illustrates an example of new parent addition in a mesh network according to embodiments of the present disclosure.

FIG. 12 illustrates an example of new parent addition in a mesh network 1200 according to embodiments of the present disclosure. For example, the mesh network 1200 may be an example of one implementation of the mesh network 900 in FIG. 9. The embodiment of the new parent addition illustrated in FIG. 12 is for illustration only. FIG. 12 does not limit the scope of the present disclosure to any particular implementation. In one embodiment, new parent addition may be implemented among base stations (e.g., 101-103 as illustrated in FIG. 1) that may be a gateway BS or a mesh BS as illustrated in FIG. 9.

Figure 13A:
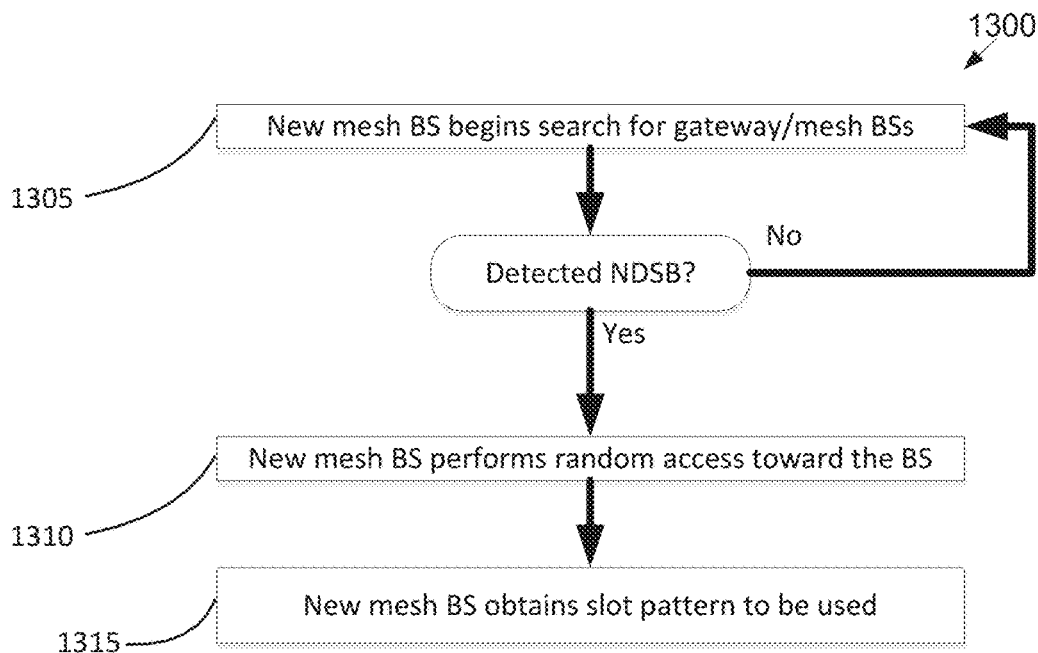
FIG. 13A illustrates a flowchart of a method for connecting to network and determining slot pattern according to embodiments of the present disclosure.

FIG. 13A illustrates a flowchart of a method 1300 for connecting to network and determining slot pattern according to embodiments of the present disclosure, as may be performed by a base station (e.g., 101-103 as illustrated in FIG. 1). The embodiment of the method 1300 illustrated in FIG. 13A is for illustration only. FIG. 13A does not limit the scope of the present disclosure to any particular implementation. In one embodiment, the base station (e.g., 101-103 as illustrated in FIG. 1) may be mesh BS 1204 as illustrated in FIG. 12.

Figure 13B:
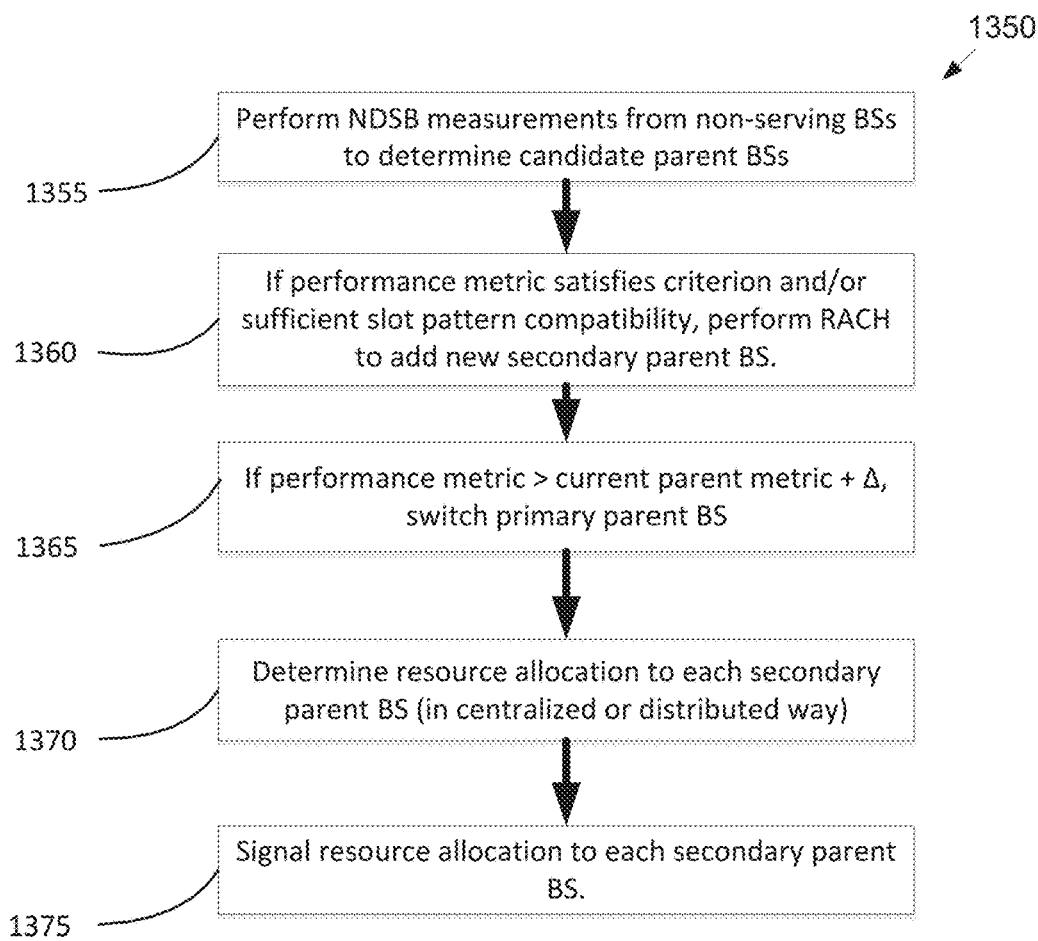
FIG. 13B illustrates a flowchart of a method for slot subset assignment to secondary parent BSs according to embodiments of the present disclosure.

FIG. 13B illustrates a flowchart of a method 1350 for slot subset assignment to secondary parent BSs according to embodiments of the present disclosure, as may be performed by a base station (e.g., 101-103 as illustrated in FIG. 1). The embodiment of the method 1350 illustrated in FIG. 13B is for illustration only. FIG. 13B does not limit the scope of the present disclosure to any particular implementation. In one embodiment, the base station (e.g., 101-103 as illustrated in FIG. 1) may mesh BS 1204 as illustrated in FIG. 12.

As illustrated in FIG. 12, an unconnected mesh BS (represented as 1204 in FIG. 12) may gain access to the core network by connecting to a first parent BS (e.g., 1210). This parent may be called as a primary parent BS, and the attachment procedure is illustrated as operations 1305 and 1310 as illustrated in FIG. 13A. Subsequently, the mesh BS (e.g., 1204) becomes a connected mesh BS and the mesh BS may determine a slot pattern either in a centralized way or in a distributed fashion (operation 1315).

Subsequently the child BS may also communicate slot pattern information to the parent BS. By performing neighborhood discovery signal block (NDSB) measurements from other non-serving cells, the mesh BS (e.g., 1204) may also determine a set of candidate parent BSs (e.g., 1202) and one or more performance metrics of the corresponding paths (operation 1355).

For any such candidate parent BS (e.g., 1202), if the performance metrics satisfy certain criteria, the mesh BS may perform a RACH procedure to a BS 1202 (e.g., new parent BS) to make the BS 1202 a secondary parent BS. This performance criterion may, for example, involve checking if the signal quality to the BS 1202 (e.g., new parent BS) is above a certain threshold or path cost to a gateway via the BS 1202 is below a certain threshold (operation 1360).

In another embodiment, the slot pattern of a candidate parent BS can be one factor in making the decision to add the candidate parent BS as a secondary parent BS. For example, the number of "hard resource" slots for which the new parent BS 1202 and the child BS have compatible transmission directions can also be considered to determine if the additional parent may be added. Such slot pattern information can be transmitted from the candidate parent BS 1202 to BS 1204, for example, within the NDSB transmission, or via a special packet during the RACH procedure.

In one embodiment, the primary parent BS may also be notified, or permission may be sought from the primary parent about the association with a new secondary parent BS. Such information can be used at the primary parent BS, for example, to coordinate the transmission directions with the secondary parent or to re-route the data/control traffic in case of radio link failure to the primary parent BS. Thus, with evolution of time, each connected mesh BS may have one primary parent BS and possibly multiple secondary parent BSs. In yet another embodiment, only a candidate BS originated from the same gateway BS of the current parent BS can be considered as a secondary parent BS.

In one embodiment, a child BS 1204 may not change a slot pattern upon adding a new secondary parent BS (e.g., 1202) while in another embodiment, the child BS may update a slot pattern using the slot pattern information obtained from the secondary parent BS(s). Subsequently the child BS may also communicate slot pattern information to the new secondary parent BS.

In one embodiment, this child slot pattern information may also be utilized by the secondary parent BS to update a slot pattern. In one embodiment, if the performance metric from a secondary parent BS (e.g., 1202) becomes larger than that of the primary parent (e.g., 1210) by a value Δ, then the mesh BS may make BS 1202 a primary parent BS and previous primary parent BS 1210 a secondary parent.

In another embodiment, such an update of the primary parent is performed after obtaining consent from the current parent BS. In yet another embodiment, such an update of the primary parent is performed in a centralized manner by a centralized entity such as, for example, the gateway BS or the network mobility management entity (MME) (operation 1365).

In one embodiment, where the communication with parent BSs is supported by orthogonal access via TDM or FDM, a mutually exclusive set of time slots may be assigned to each parent BS (fractional slot allocation not allowed). Here factional slot allocation refers to assigning a fractional subset of frequency resources associated with one timeslot to a parent BS. The determination of this slot assignment can be performed by either the primary parent BS, by all parent BSs in a sequential manner, by the child BS, or by a centralized network entity (operation 1370).

In one embodiment, all the slots that are compatible with a primary parent BS are assigned to the primary parent BS, and the remaining slots can be assigned to the secondary parent BSs. In another embodiment, each slot may be assigned to the parent BS which has the most compatible slot type, based on a preference order. One example of this preference order is illustrated in the TABLE 1.

In another embodiment, mutually exclusive fractions of each hard slot can be given to the different parent BSs (fractional slot allocation allowed), but for the soft resources, the whole slot can be assigned only to a single parent (fractional slot allocation not allowed). After assigning the slots to parents, the parent/child BSs may be notified about the assignments by a signaling message from the network entity making the assignment decisions. Such resource allocation can be communicated via resource "revoke" or resource "grant" messages. The former may be used to indicate which resource slots to avoid, while the latter may be used to indicate which resource slots may be utilized by the parent-child link.

TABLE 1

Preferred slot types at a parent BS

| Child slot type | Preference order for parent slot type (remaining types are incompatible) |
|---|---|
| hTx | hRx > hFl > sRx > sFl |
| hRx | hTx > hFl > sTx > sFl |
| hFl | hFl > sFl > hTx = hRx > sTx = sRx |
| sTx | hRx > hFl > sRx > sFl > sTx > hTx |
| sRx | hTx > hFl > sTx > sFl > sRx > hRx |
| sFl | hFl > sFl > hTx = hRx > sTx = sRx |

In another embodiment involving SDM based parent links, a communication with multiple parent BSs is possible on the same time slot and on same frequency. While communication may be on all slot patterns with the primary parent BS 1210, the secondary parent BS(s) (e.g., 1202) may only be allowed to communicate with a child BS 1204 on a subset of the slots.

The determination of this subset of slots can be to prevent resource allocation conflicts from the parent BSs and can be performed by either a centralized entity such as the gateway BS or MME, the primary parent BS or by the mesh BS itself. Upon determining the subset of resources to be assigned to each parent, the corresponding set is transmitted to that parent BS. These two procedures are illustrated as operations 1370 and 1375 in FIG. 13B.

As an example, in one such algorithm, all "hard resources" slots at a BS (e.g., child BS 1204) are allocated to all parent BSs with compatible slot types. However, for the case of soft resources, a "soft resource" slot at the BS (e.g., child BS 1204) may not be shared with any secondary parent BS if the corresponding slot type at a primary parent BS (e.g., 1210) is compatible (i.e., having opposite transmission direction or flexible transmit direction). If the slot type at primary parent is incompatible, then the "soft resource" slot may be shared with one secondary parent BS having a compatible slot type (i.e., having opposite or flexible transmission direction).

Figure 14:
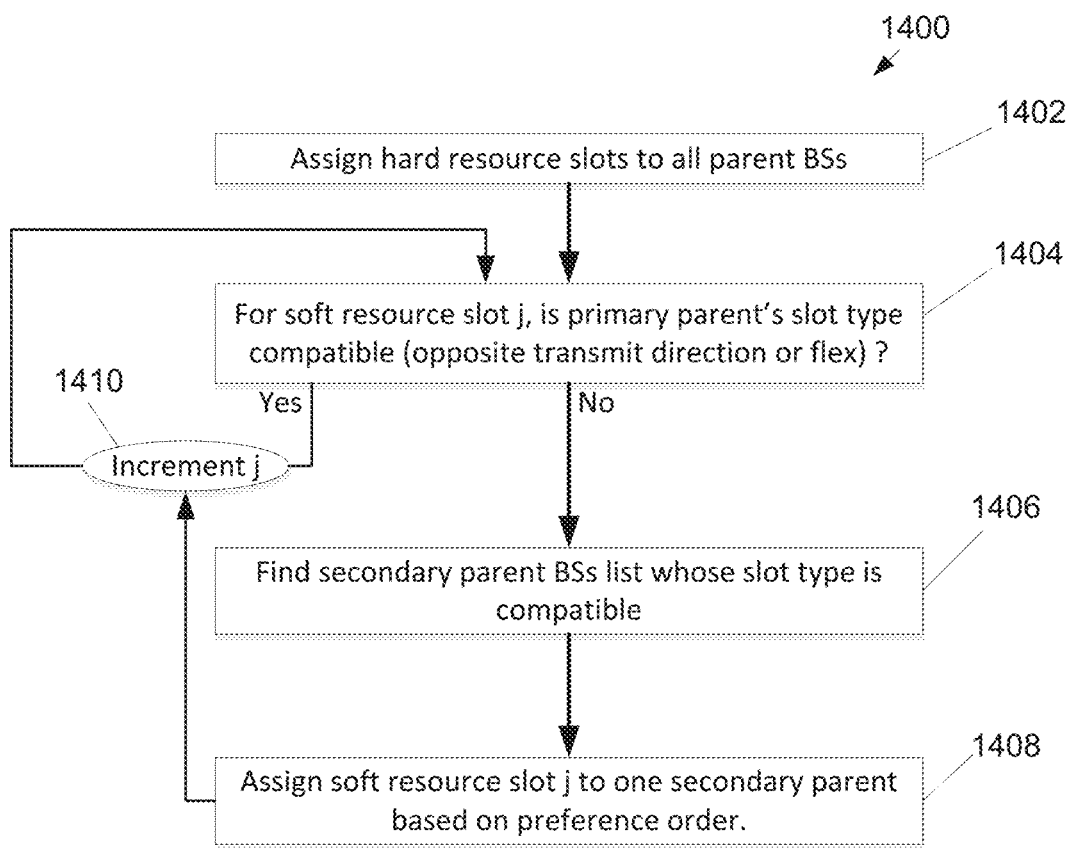
FIG. 14 illustrates a flowchart of a method for slot pattern allocation algorithm according to embodiments of the present disclosure.

For determining this secondary parent BS, a preference may be given to the secondary parent BS with better performance metric and/or one having opposite transmission direction and/or having a hard resource type (see TABLE 1 for an example preference order). This example resource assignment algorithm is illustrated in FIG. 14. Such resource allocation can be communicated to the parent BSs either via a resource "revoke" or resource "grant" messages. The former may be used to indicate which resource slots to avoid, while the latter may be used to indicate which resource slots may be utilized by the parent-child link.

In another embodiment involving SDM based parent links, a child mesh BS derives its slot pattern from the primary parent's slot pattern. Subsequently, the child mesh BS may compare the slot pattern of a primary parent BS and one or more of secondary BSs. For slots from secondary BSs whose pattern does not agree with those of parent BS, the child mesh BS can inform such conflicting slots to the corresponding secondary BSs. As one example, the corresponding secondary BS understands that such conflicting slots cannot be used for communication with the corresponding child mesh BS.

In another example, the secondary BSs may modify a slot pattern based on such input. Even for the slots having the same pattern between primary and secondary parent BSs or between secondary parent BSs, a child mesh BS may indicate the slots that the child mesh BS may dedicate the use for a particular parent BS. For instance, the PDCCH monitoring from a particular parent BS by the child mesh BS may be performed only in particular indicated slots. The possible set of UL slots for UL transmission to a particular parent BS may be indicated to the parent BSs as well.

Figure 13C:
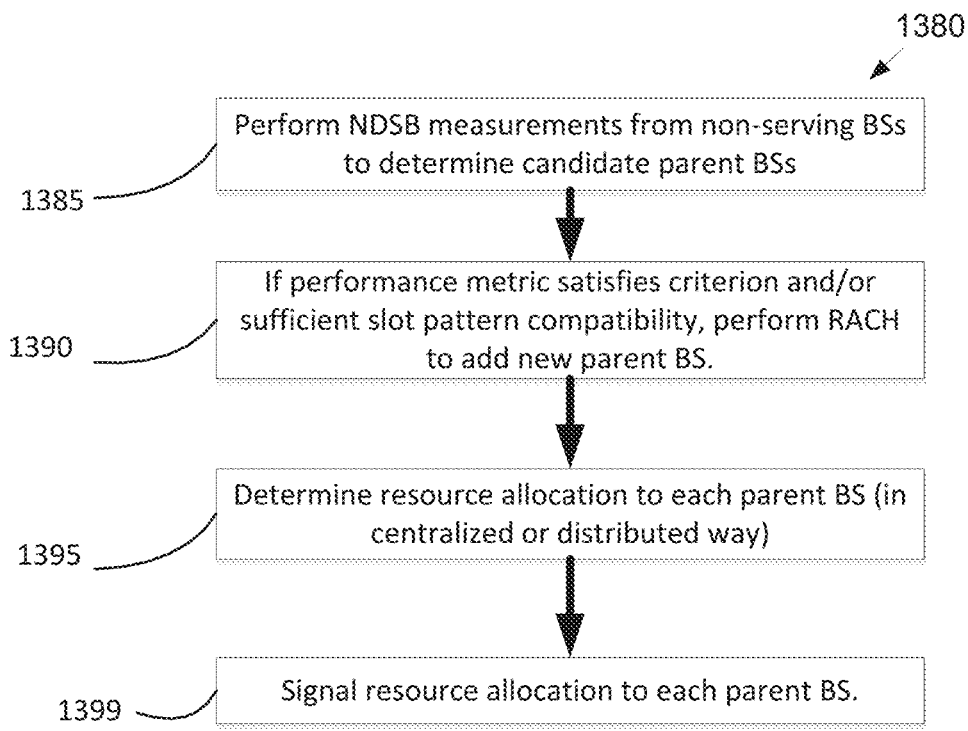
FIG. 13C illustrates a flowchart of a method for slot subset assignment to parent BSs according to embodiments of the present disclosure.

FIG. 13C illustrates a flowchart of a method 1380 for slot subset assignment to parent BSs according to embodiments of the present disclosure, as may be performed by a base station (e.g., 101-103 as illustrated in FIG. 1). The embodiment of the method 1380 illustrated in FIG. 13C is for illustration only. FIG. 13C does not limit the scope of the present disclosure to any particular implementation. In one embodiment, the base station (e.g., 101-103 as illustrated in FIG. 1) may be mesh BS 1204 as illustrated in FIG. 12.

In one embodiment with SDM based links, a child mesh BS (e.g., 1204) does not prioritize a primary parent BS over the secondary parents, from the resource allocation point of view. An example flowchart for this embodiment is illustrated in FIG. 13C, which begins with the NDSB measurements in operation 1385 and performance metric evaluation to add a new parent BS in operation 1390 similarly as described above with regard to operations 1355 and 1360, respectively, in FIG. 13B.

Each parent BS 1210/1202 is allowed to communicate with the child BS on a subset of the slots. The determination of this subset of slot patterns can be performed to prevent resource allocation conflicts from the parent BSs and can be performed by either a centralized entity such as the gateway BS or MME, the primary parent BS or by the mesh BS itself. This procedure is illustrated as operation 1395 in FIG. 13C.

As an example, in one such algorithm, all "hard resources" slots at a BS (e.g., child BS 1204) can be allocated to all parent BSs. However, for the case of soft resources, a "soft resource" slot at a BS ((e.g., child BS 1204) is shared with one parent BS such that the corresponding slot type of the parent is compatible (of opposite or flexible transmission direction). For determining the assignment of the soft resources, preference may be given to the parent BSs with better performance metric, one having opposite transmission direction and having hard resource type (see TABLE 1 for an example). The assignments can then be communicated to the mesh BS and its parent BSs via resource "revoke" or resource "grant" messages, for example, as illustrated in operation 1399.

FIG. 14 illustrates a flowchart of a method 1400 for slot pattern allocation algorithm according to embodiments of the present disclosure, as may be performed by a base station (e.g., 101-103 as illustrated in FIG. 1). The embodiment of the method 1400 illustrated in FIG. 14 is for illustration only. FIG. 14 does not limit the scope of the present disclosure to any particular implementation. In one embodiment, the base station (e.g., 101-103 as illustrated in FIG. 1) may be mesh BS 1204 as illustrated in FIG. 12.

As discussed above, the slot pattern allocation algorithm is based on compatibility according to the preference order such as the example illustrated in Table 1. In operation 1402, the child BS starts by assigning hard resource slots to its parent BSs. In operation 1404, the child BS assigns soft slots to its primary parent that are of a compatible type and moves sequentially through the soft slots (operation 1410). For soft slots that are not compatible with the primary parent, the child BS finds secondary parent BSs whose slot type is compatible (operation 1410) and assigns those soft slots to one of the secondary parent BSs based on a preference order (e.g., as illustrated in Table 1) (operation 1408) and continues to sequentially assign the remainder of the slots (operation 1410). While FIG. 14 discusses primary parent BS prioritization, similar embodiments may not prioritize the primary parent BS (e.g., operation 1404 may not be performed).

Various embodiments of the present disclosure provide for timing alignment within a mesh network and in particular a tree based mesh network where a child BS may have parent and grandparent (etc.) BSs. As illustrated in the aforementioned embodiments, conflicts were considered due to resource allocation, timing alignment in a mesh network also is a critical issue which is discussed in this section.

Figure 15A:
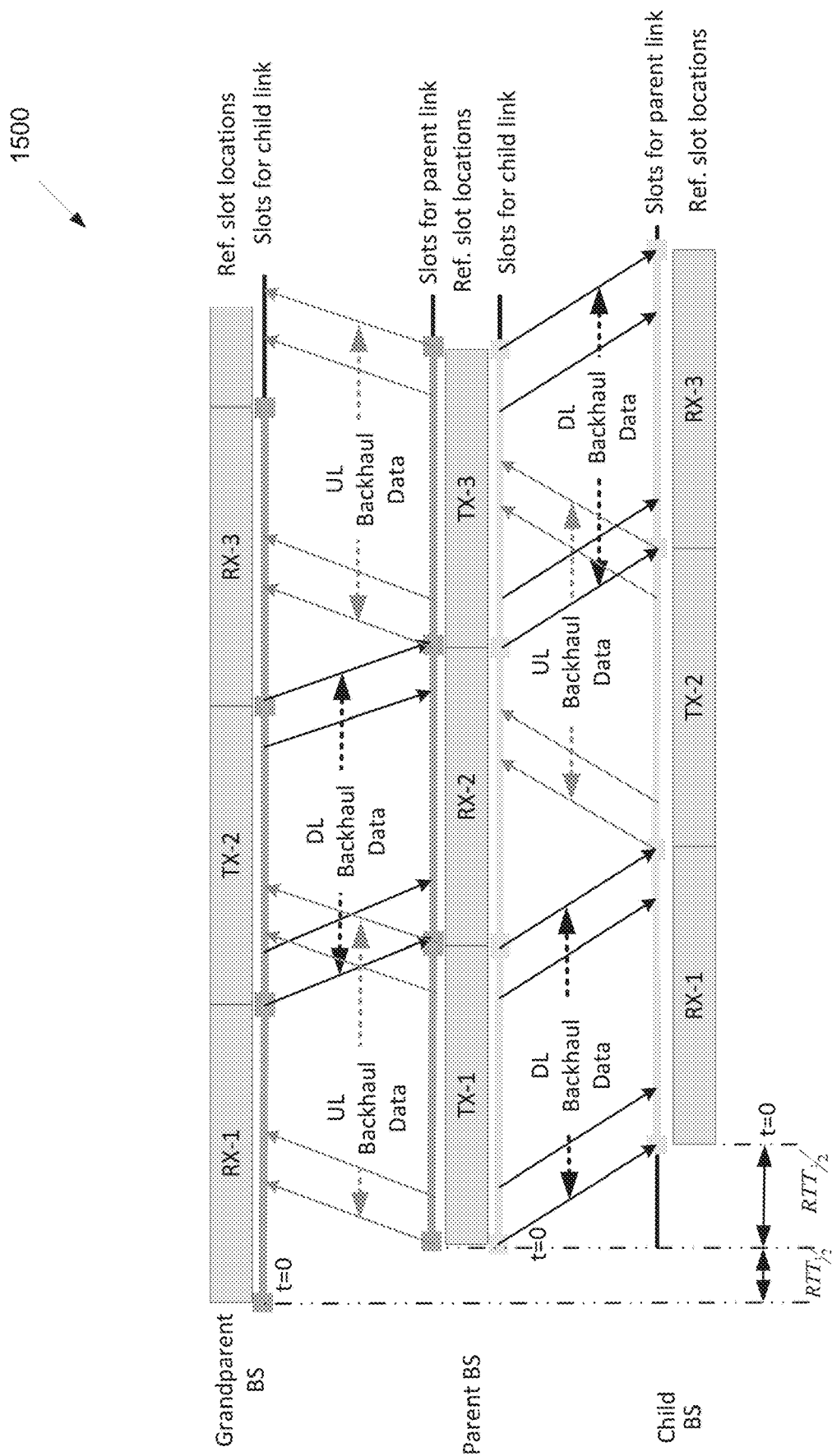
FIG. 15A illustrates an example timing diagram of Rx slot misalignment without use of timing advance.

FIG. 15A illustrates an example timing diagram 1500 of Rx slot misalignment without use of timing advance. The embodiment of the Rx slot misalignment without use of timing advance illustrated in FIG. 15A is for illustration only. FIG. 15A does not limit the scope of the present disclosure to any particular implementation. In one embodiment, Rx slot misalignment without use of timing advance may be implemented among base stations (e.g., 101-103 as illustrated in FIG. 1) that may be a gateway BS or a mesh BS as illustrated in FIG. 9.

In one example, a tree topology is considered, where each connected mesh BS has a single parent BS. Each BS or a UE may obtain timing information from a parent/serving mesh BS via a synchronization procedure, enabled by receiving the synchronization signals from the parent. Note that the receipt of these synchronization signals is delayed by the one-way propagation delay from parent BS to child BS. Correspondingly the time reference at a child BS may be delayed from a parent BS by half the round trip time (RTT) for the link, which is illustrated in FIG. 15A as $RTT_1/2$ for grandparent BS—parent BS link and $RTT_2/2$ for parent BS—child BS link.

In such a tree structure with time domain slots, one or more of the following properties can be applied. In one example, none of the received signals at a mesh BS overlap with the transmit signals. This may ensure that the half duplex constraint is satisfied.

In one example, the received signals at a mesh BS from multiple sources (received on different frequency resources) are time aligned. Such timing alignment may be required, for example, to perform joint demodulation using a single base-band unit. In the case of SDM where the multiple received signals are demodulated by separate base-band units, such an alignment may not be necessary.

These criteria can be satisfied, for example, by providing guard time between the slots and performing a timing advance operation. For example, without a guard band, as illustrated in FIG. 15A, the received signals at a parent BS in a slot RX-2 may not be aligned if the child BS transmits the uplink signal in the TX-2 reference slot location. By providing a guard time between the reference slot locations RX-1 and TX-2 for child BS, and advancing the uplink transmission at the child BS by $RTT_2$ with respect to the reference slot location TX-2 (an operation referred to as timing advance), the received signals at the parent BS in slot RX-2 can be time aligned.

Figure 15B:
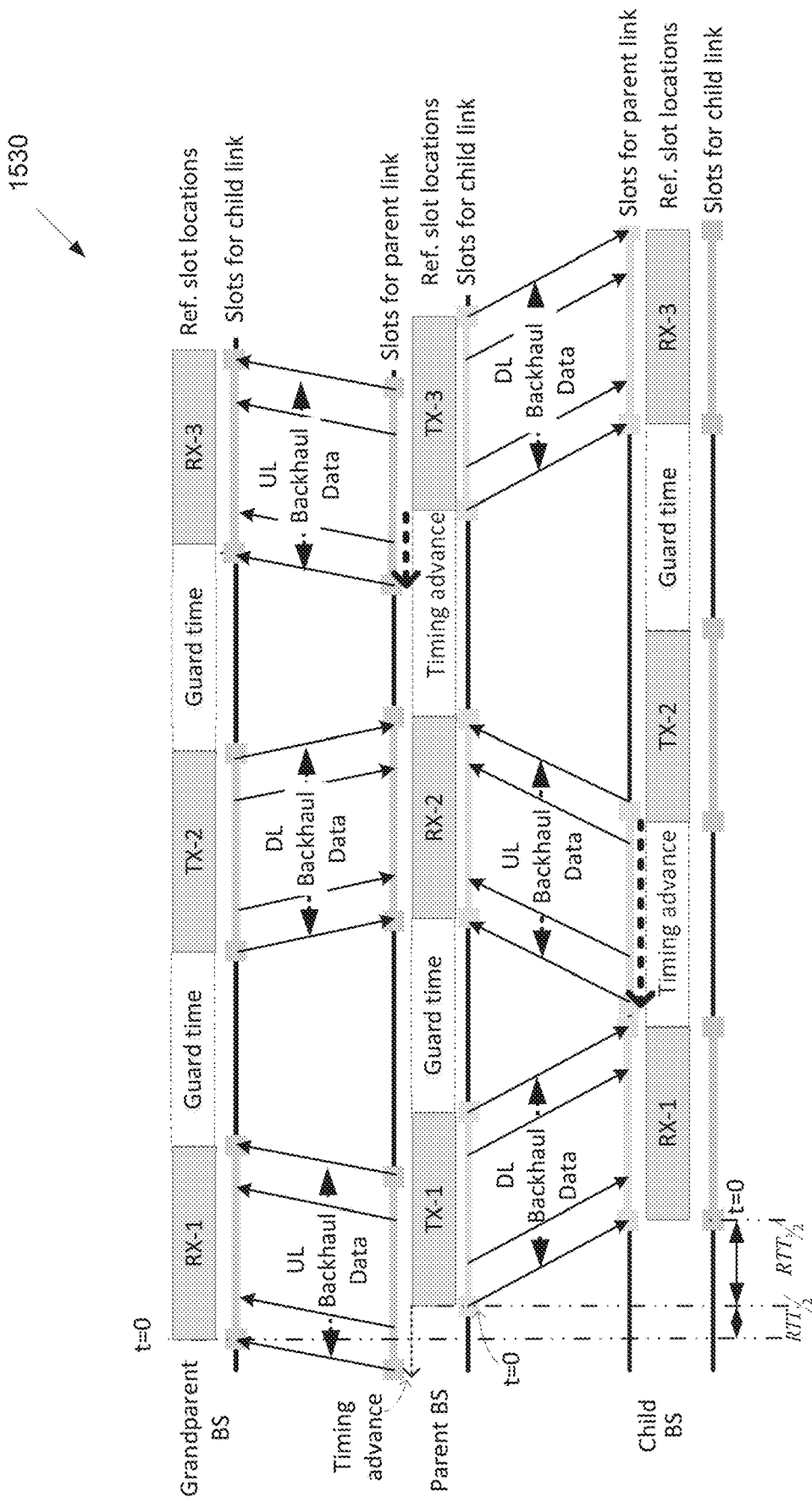
FIG. 15B illustrates an example timing diagram of Rx slot alignment with timing advance for UL in a single parent BS scenario according to embodiments of the present disclosure.

FIG. 15B illustrates an example timing diagram 1530 of Rx slot alignment with timing advance for UL in a single parent BS scenario according to embodiments of the present disclosure. The embodiment of the Rx slot alignment with timing advance for UL illustrated in FIG. 15B is for illustration only. FIG. 15B does not limit the scope of the present disclosure to any particular implementation. In one embodiment, Rx slot alignment with timing advance for UL may be implemented among base stations (e.g., 101-103 as illustrated in FIG. 1) that may be a gateway BS or a mesh BS as illustrated in FIG. 9.

In one embodiment of such a single parent BS scenario, each BS may perform such a timing advance operation for the uplink backhaul data on transmit slots, so as to time align the uplink backhaul received signals at the parent BS. However, the downlink transmissions from parent BSs to the child BSs and access links may be performed at the reference slot locations (i.e., without timing advance).

This operation can be accommodated by including a guard time preceding every slot, as illustrated in FIG. 15B. The length of this guard time can be, for example, at least as long as the maximum round trip delay (for one hop link) to be supported by the network. The timing advance to be used at a child BS for the uplink path may be configured by the parent BS or determined by the child BS independently.

In another embodiment of the single parent BS scenario, each BS may perform a timing advance for both the uplink data to its parent BS and for downlink data to its child BSs. In one example, the timing advance used for the downlink signals can be chosen to be same as the timing advance for uplink signals to parent BS. This can help in aligning all outgoing transmissions from the BS. In another example, upon handover to a different parent mesh BS, a mesh BS may change its slot timing to align with the new parent BS. However, by using this downlink timing advance, the mesh BS may choose to keep the timing of uplink/downlink transmissions from/to its child BSs unaltered to reduce the number of network reconfigurations required.

Note that if a timing advance is not performed for a TX slot at a BS for DL transmissions, then a guard time of at least the maximum RTT may be required between each TX slot and the next RX slot of that BS, as illustrated for slots TX-1 and RX-2 for parent BS in FIG. 15B. This is in addition to the guard time required between each RX slot and the following TX slot for performing uplink timing advance.

Figure 15C:
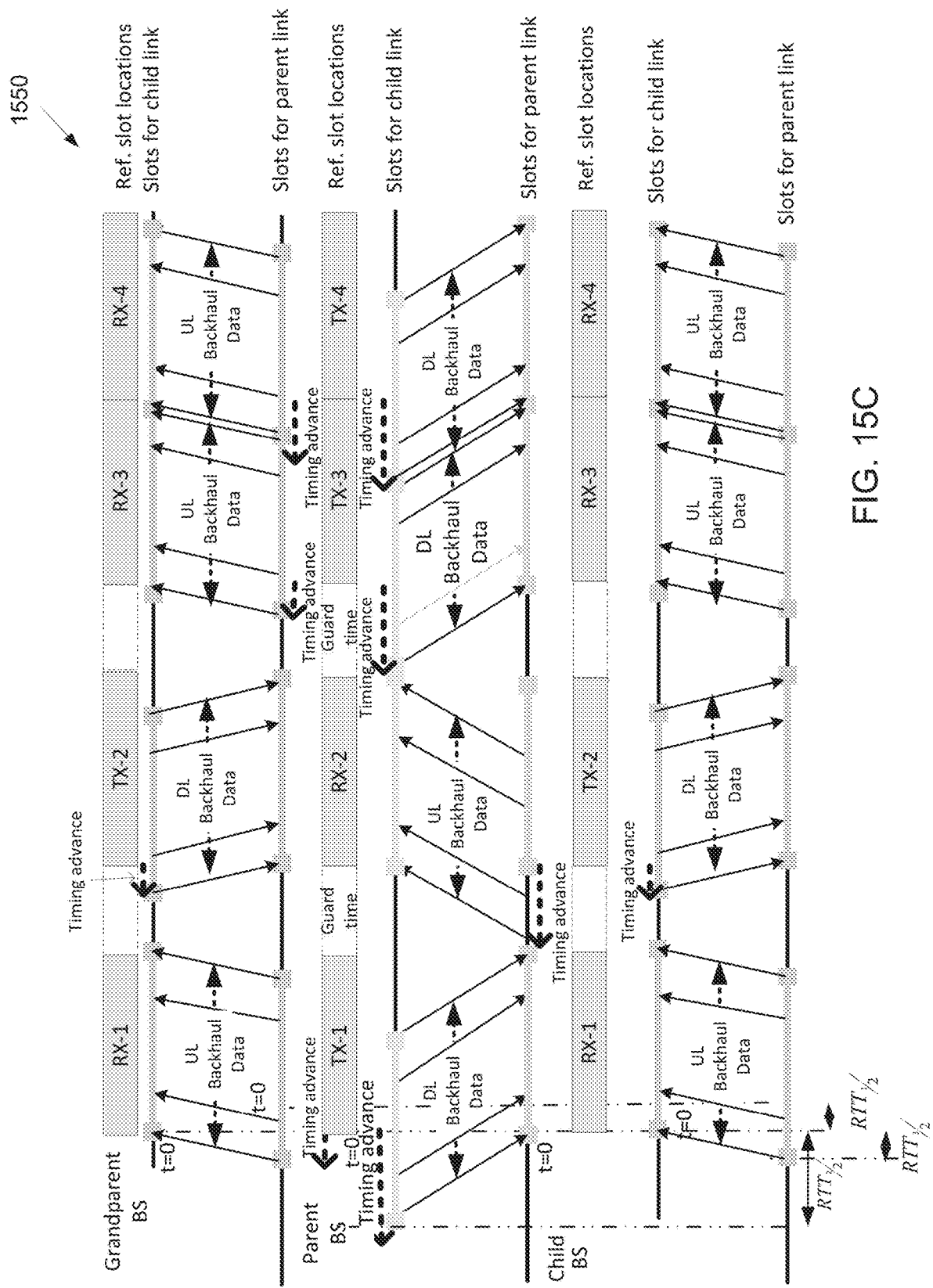
FIG. 15C illustrates an example timing diagram of Rx slot alignment with timing advance for both UL and DL in a single parent BS scenario according to embodiments of the present disclosure.

FIG. 15C illustrates an example timing diagram 1550 of Rx slot alignment with timing advance for both UL and DL in a single parent BS scenario according to embodiments of the present disclosure. The embodiment of the Rx slot alignment with timing advance for both UL and DL illustrated in FIG. 15C is for illustration only. FIG. 15C does not limit the scope of the present disclosure to any particular implementation. In one embodiment, Rx slot alignment with timing advance for both UL and DL may be implemented among base stations (e.g., 101-103 as illustrated in FIG. 1) that may be a gateway BS or a mesh BS as illustrated in FIG. 9.

Thus, in another example, a parent mesh BS may perform timing advance on both the UL and DL transmit slots so that the slot timing of the child BS aligns with the slot timing of the parent BS. In this approach, a guard time may be required between two adjacent slots if: the first slot is a hard/soft receive resource or Flexible resource (hRx, sRx, hFl, sFl) and the second slot is a hard/soft or flexible transmit resource or is a soft receive resource (hTx, sTx, sRx, hFl, sFl), or vice versa. The length of this guard time can be, for example, at least as long as half the maximum round trip delay (for one hop link) to be supported by the network, as illustrated in FIG. 15C. In one example, the required timing advance and local timing for the child link is determined by the parent BS and is informed to the child BS. The child BS may then adjust its slot timing accordingly. This is evident from FIG. 15C, where the local time t=0 at child BS matches the local time t=0 at parent BS, due to the timing advance on the downlink transmission from the parent BS. In another example, the required timing advance for a slot is determined by the receiving BS, and the corresponding timing advance information is shared with the transmit BS(s). In this approach, after obtaining timing synchronization with the parent BS, the child BS advances its slot timing by RTT/2 so that its local timing matches with the parent's local time.

Figure 15D:
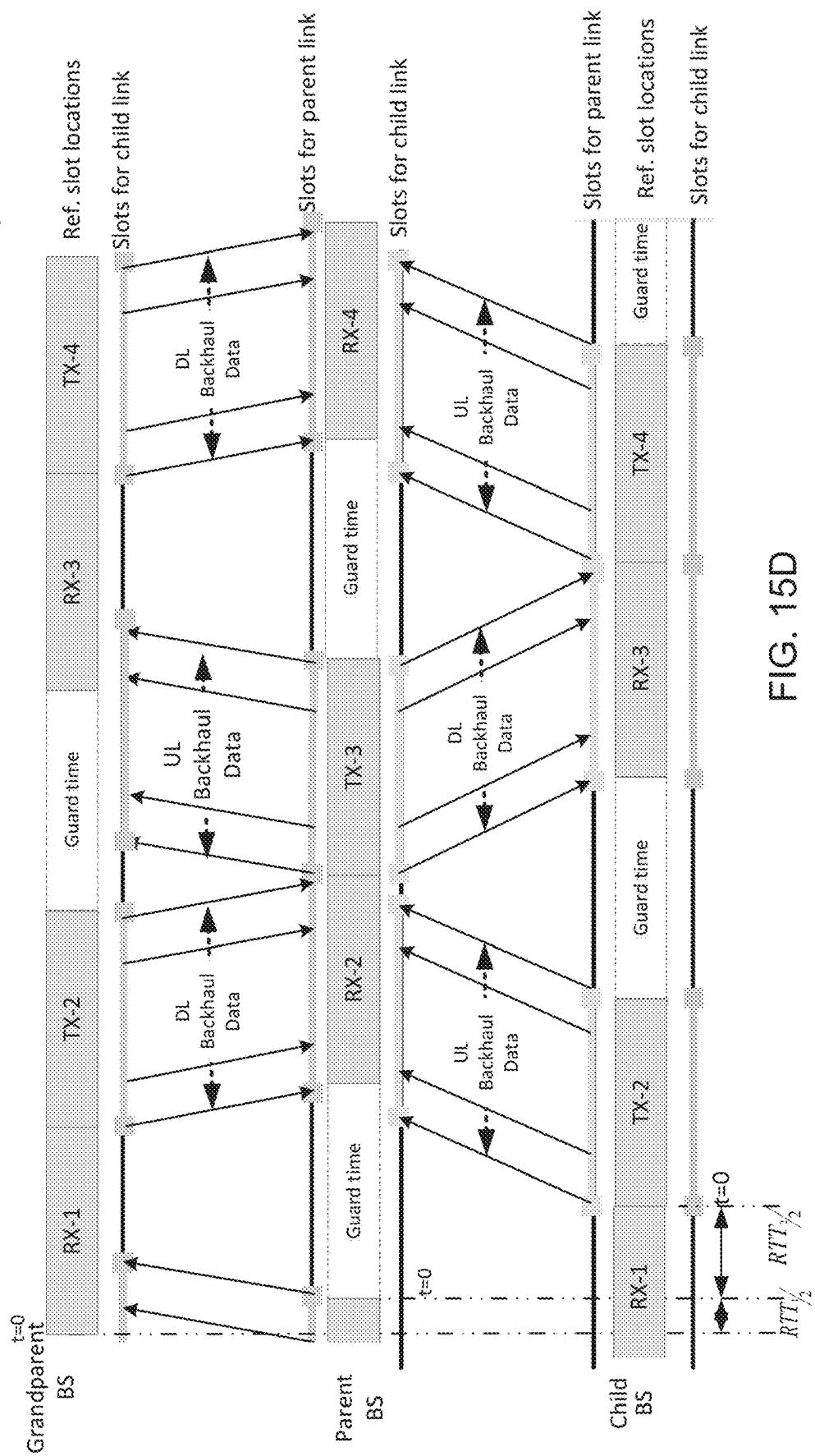
FIG. 15D illustrates an example timing diagram of SDM based communication in single parent BS scenario without RX slot alignment according to embodiments of the present disclosure.

FIG. 15D illustrates an example timing diagram 1570 of SDM based communication in a single parent BS scenario without RX slot alignment according to embodiments of the present disclosure. The embodiment of the SDM based communication in a single parent BS scenario without RX slot alignment illustrated in FIG. 15D is for illustration only. FIG. 15D does not limit the scope of the present disclosure to any particular implementation. In one embodiment, SDM based communication in a single parent BS scenario without RX slot alignment may be implemented among base stations (e.g., 101-103 as illustrated in FIG. 1) that may be a gateway BS or a mesh BS as illustrated in FIG. 9.

In another embodiment of a single parent BS scenario, where the different links connected to a mesh BS may be supported by SDM, timing alignment may not be required for the received slots. Thus, only property (P1) i.e. non-overlapping of the transmit and receive signals may need to be satisfied. In this scenario, a guard time between the received slots and the transmit slots can be omitted. A guard time may only be required between two slots if the first slot is a hard/soft Tx resource or flexible resource (hTx, sTx, hFl, sFl) and the second slot is a hard/soft or flexible receive resource or is a soft receive resource (hRx, sRx, sTx, hFl, sFl). One example illustration of this embodiment is provided in FIG. 15D.

Figure 16A:
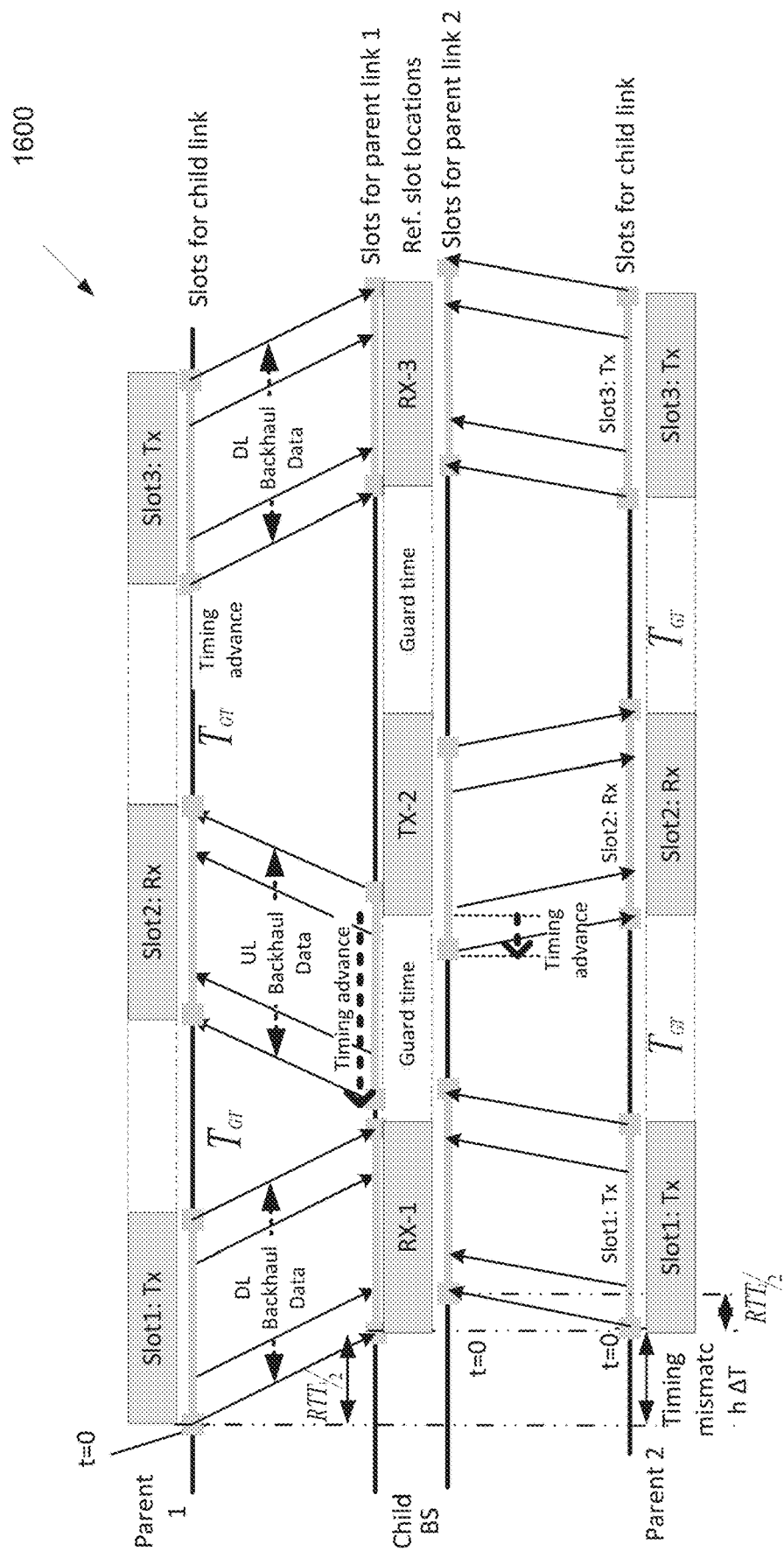
FIG. 16A illustrates an example timing diagram of timing offset and different round trip times with multiple parent BSs according to embodiments of the present disclosure.

FIG. 16A illustrates an example timing diagram 1600 of timing offset and different round trip times with multiple parent BSs according to embodiments of the present disclosure. The embodiment of the timing offset and different round trip times with multiple parent BSs illustrated in FIG. 16A is for illustration only. FIG. 16A does not limit the scope of the present disclosure to any particular implementation. In one embodiment, timing offset and different round trip times with multiple parent BSs may be implemented among base stations (e.g., 101-103 as illustrated in FIG. 1) that may be a gateway BS or a mesh BS as illustrated in FIG. 9. As illustrated in FIG. 16A, the child BS is assumed to be timing aligned to a parent 1.

In a multiple parent scenario, the requirement for the guard time can be even more stringent since: (a) the two parent BSs may have different timings and (b) the round-trip travel time from either parent BS to the child BS may be different. This is illustrated in FIG. 16A, where the child BS is timing aligned to parent BS 1. As illustrated in FIG. 16A, while the child BS can use timing advance for aligning Rx signals at both parent BSs, the downlink received signals from parent BSs may not align if downlink timing advance is not performed. This section of the disclosure provides embodiments to deal with such timing mismatches between the parent BSs.

Figure 16B:
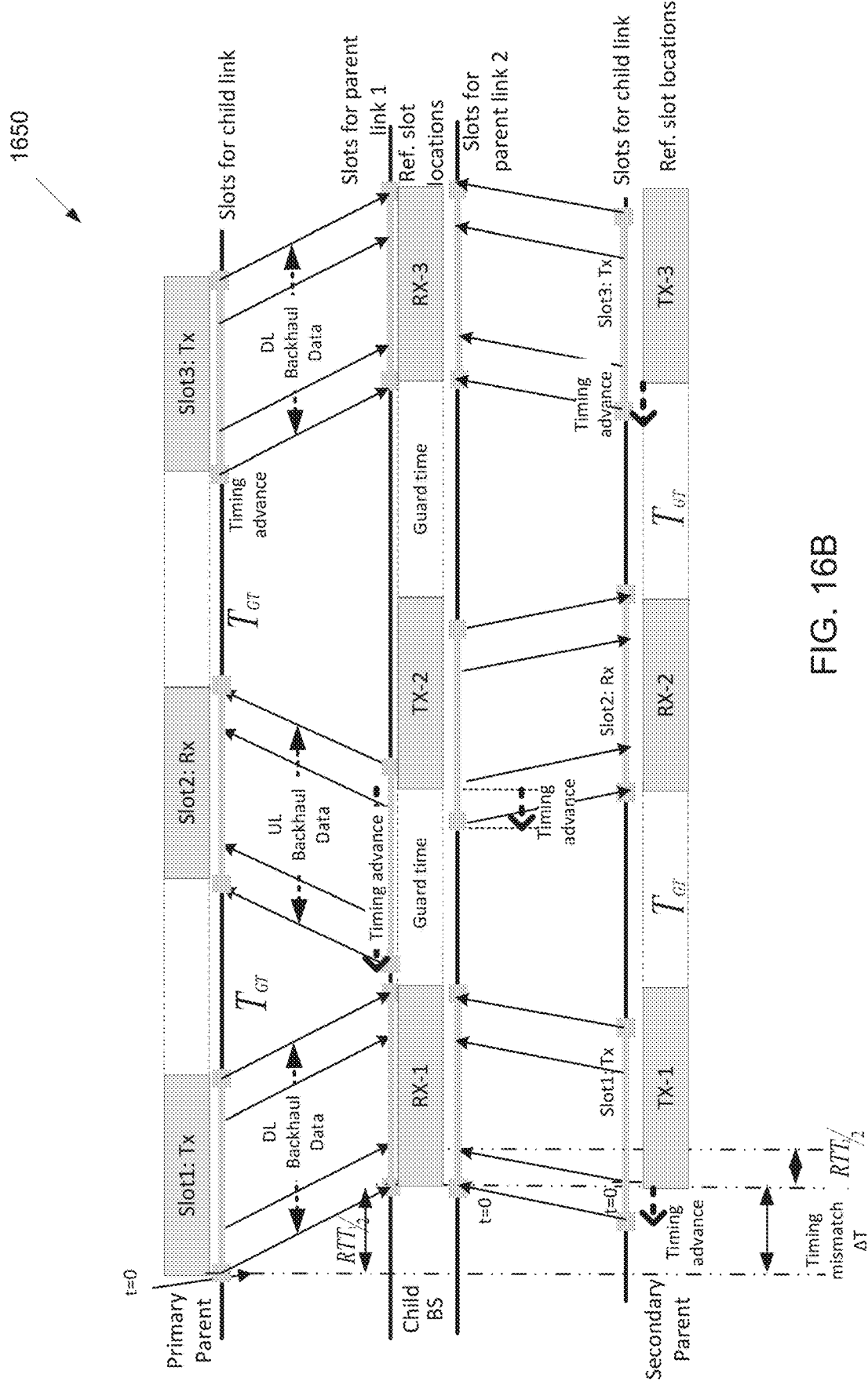
FIG. 16B illustrates an example timing diagram of timing advance at secondary parent BS to align RX slots at the child BS according to embodiments of the present disclosure.

FIG. 16B illustrates an example timing diagram 1650 of timing advance at secondary parent BS to align RX slots at the child BS according to embodiments of the present disclosure. The embodiment of the timing advance at secondary parent BS to align RX slots at the child BS illustrated in FIG. 16B is for illustration only. FIG. 16B does not limit the scope of the present disclosure to any particular implementation. In one embodiment, timing advance at secondary parent BS to align RX slots at the child BS may be implemented among base stations (e.g., 101-103 as illustrated in FIG. 1) that may be a gateway BS or a mesh BS as illustrated in FIG. 9.

Figure 17A:
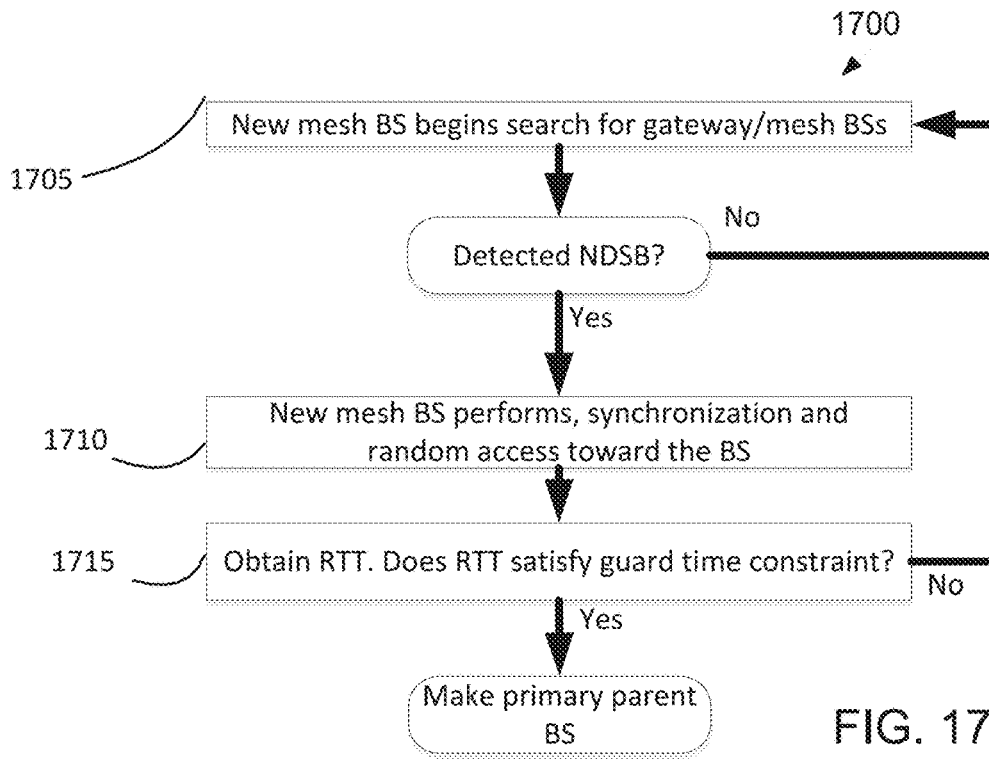
FIG. 17A illustrates a flowchart of a method for adding primary parent BS based on the guard time constraint according to embodiments of the present disclosure.

FIG. 17A illustrates a flowchart of a method 1700 for adding primary parent BS based on the guard time constraint according to embodiments of the present disclosure. The embodiment of the adding primary parent BS based on the guard time constraint illustrated in FIG. 17A is for illustration only. FIG. 17A does not limit the scope of the present disclosure to any particular implementation. In one embodiment, the method 1700 for adding primary parent BS based on the guard time constraint may be implemented by base station (e.g., 101-103 as illustrated in FIG. 1) such as mesh BS 1204 as illustrated in FIG. 12.

In one embodiment, a time duration of the guard time between slots is considered as $T_{GT}$. In one embodiment, an unconnected mesh BS (e.g., 1204 as illustrated in FIG. 12) searches for a gateway/mesh BSs in the network (operation 1705). When the unconnected mesh BS gains access to the network via a first parent BS (e.g., 1210), the unconnected mesh BS (e.g., 1204) performs synchronization signal acquisition to obtain timing information (operation 1710).

Furthermore, an estimate of the round-trip time $RTT_1$ may be obtained for the parent-child link (e.g., 1210, 1204) from the parent BS. And then, the slot pattern to use and guard band information may be determined/obtained in either a centralized or a distributed fashion. In one embodiment if $RTT_1 > T_{GT}$, then the mesh BS may disassociate with the parent BS 1210 and continue searching for new parent BSs. This procedure is illustrated as operation 1715 in FIG. 17A. In various embodiments, such a decision to break association is taken by the parent BS 1210. If the association is not broken, this first BS is referred to as the primary parent BS.

Figure 17B:
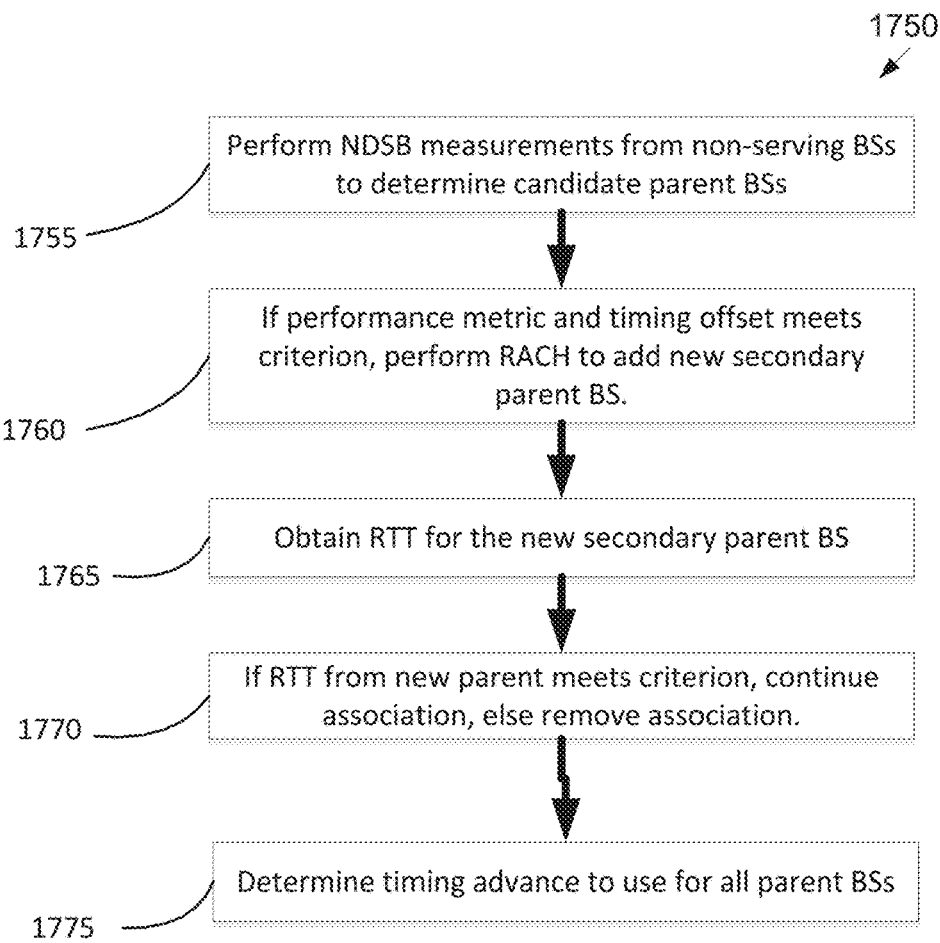
FIG. 17B illustrates a flowchart of a method for adding secondary parent BS based on the guard time constraint on RTT and time offset according to embodiments of the present disclosure.

FIG. 17B illustrates a flowchart of a method 1750 for adding secondary parent BS based on the guard time constraint on RTT and time offset according to embodiments of the present disclosure. The embodiment of the adding secondary parent BS based on the guard time constraint on RTT and time offset illustrated in FIG. 17B is for illustration only. FIG. 17B does not limit the scope of the present disclosure to any particular implementation. In one embodiment, the method 1750 for adding secondary parent BS based on the guard time constraint on RTT and time offset may be implemented in a base station (e.g., 101-103 as illustrated in FIG. 1) such as mesh BS 1204 as illustrated in FIG. 12.

In various embodiments, after connecting to the network via a primary parent BS, the child BS 1204 may also perform NDSB measurements for other non-serving mesh BSs to obtain a list of candidate parent BSs, along with their path performance metrics and slot timing information (operation 1755). In one embodiment the child mesh BS (e.g., 1204) may perform a RACH procedure to a candidate parent BS (e.g., 1202) to establish a new secondary parent BS only if the timing offset between the candidate parent and the primary parent (e.g., 1210) $\Delta T$ meets a certain criterion (operation 1760).

In one embodiment, this criterion may involve, for example, ensuring that $|\Delta T|$ is below a certain acceptable timing error threshold. By performing the RACH procedure to the new parent BS 1202, the child BS 1204 can also obtain the round trip time $RTT_2$ estimate for the new parent BS 1202 (operation 1765). If $RTT_2$ fails to satisfy a certain guard time criterion, the child mesh BS 1204 may choose to disassociate with the new parent BS 1202 (operation 1770). This criterion can be to ensure that the provided guard time is sufficient for supporting the new parent BS 1202.

In one embodiment, where timing advance is only used for the uplink signals to the parent BS (as discussed above), this criterion may involve, for example, ensuring that $|\Delta T+(RTT_2-RTT_1)/2| \leq T_{GT}-C_1$ and $|(RTT_2+RTT_1)/2-\Delta T| \leq T_{GT}-C$, where $RTT_2$ is the round trip time from the candidate parent BS to the child BS and C is some constant. Note that $\Delta T+(RTT_2-RTT_1)/2$ may be estimated using the time stamp mentioned on the NDSB from secondary BS and the (local) time at which this NDSB is received at the child BS. In another embodiment while the primary parent BS does not use timing advance for the downlink signals, the secondary parent BS may perform timing advance on its downlink signals so as to align the received signals at the child BS. In this scenario the criterion may involve, for example, ensuring that $|\Delta T+(RTT_2-RTT_1)|$ is below a certain acceptable threshold and $$\left| \frac{RTT_2 + RTT_1}{2} - \Delta T \right| \leq T_{GT} - C_2,$$

where $C_1$, $C_2$ are some constants. An additional example of this embodiment is also illustrated in FIG. 16B discussed above.

In another embodiment where the timing advance is used for both the uplink and downlink signals (e.g., similar to FIG. 15C), the criterion may involve, for example, ensuring that $$\Delta T + \frac{RTT_2}{2} \leq T_{GT} - C,$$

where C is a predetermined constant. In yet another embodiment where the different mesh links are supported by SDM, timing advance is not used for either UL/DL and only a guard time is provided between transmit and receive slots (e.g., as illustrated in FIG. 15D), and the criterion may involve, for example, ensuring that $$\left| \Delta T + \frac{RTT_2 - RTT_1}{2} \right| \leq T_{GT} - C.$$

The timing advance used to transmit uplink signals to the parent BSs 1210 and 1202 must be carefully determined. In one embodiment this determination is performed by the child BS 1204, while in another embodiment the primary parent BS 1210 performs this decision upon receiving all the relevant information from the child BS 1204 (operation 1775).

Figure 18:
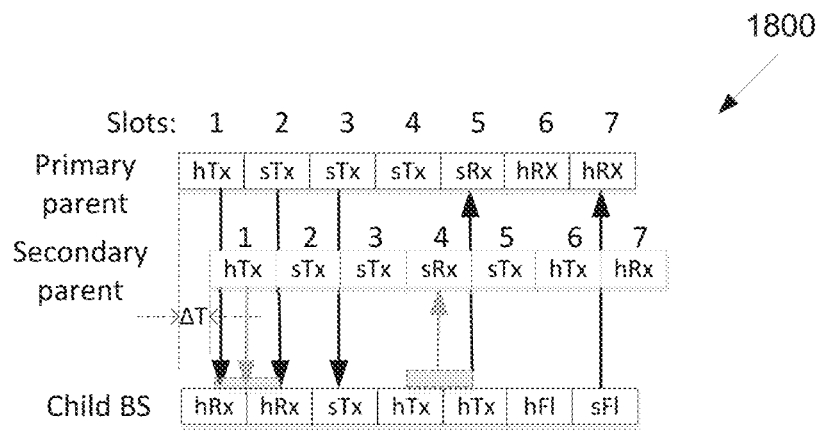
FIG. 18 illustrates an example slot assignment diagram 1800 for slot assignment to secondary parent BS having arbitrary timing mismatch $\Delta T$ according to embodiments of the present disclosure.

FIG. 18 illustrates an example slot assignment diagram 1800 for slot assignment to secondary parent BS having arbitrary timing mismatch $\Delta T$ according to embodiments of the present disclosure. The embodiment of the slot assignment to secondary parent BS having arbitrary timing mismatch $\Delta T$ illustrated in FIG. 18 is for illustration only. FIG. 18 does not limit the scope of the present disclosure to any particular implementation. In one embodiment, the slot assignment operation to secondary parent BS having arbitrary timing mismatch $\Delta T$ may be implemented in mesh network 1200 for child mesh BS 1204 between primary parent BS 1210 and secondary parent BS 1202 as illustrated in FIG. 12.

Figure 19:
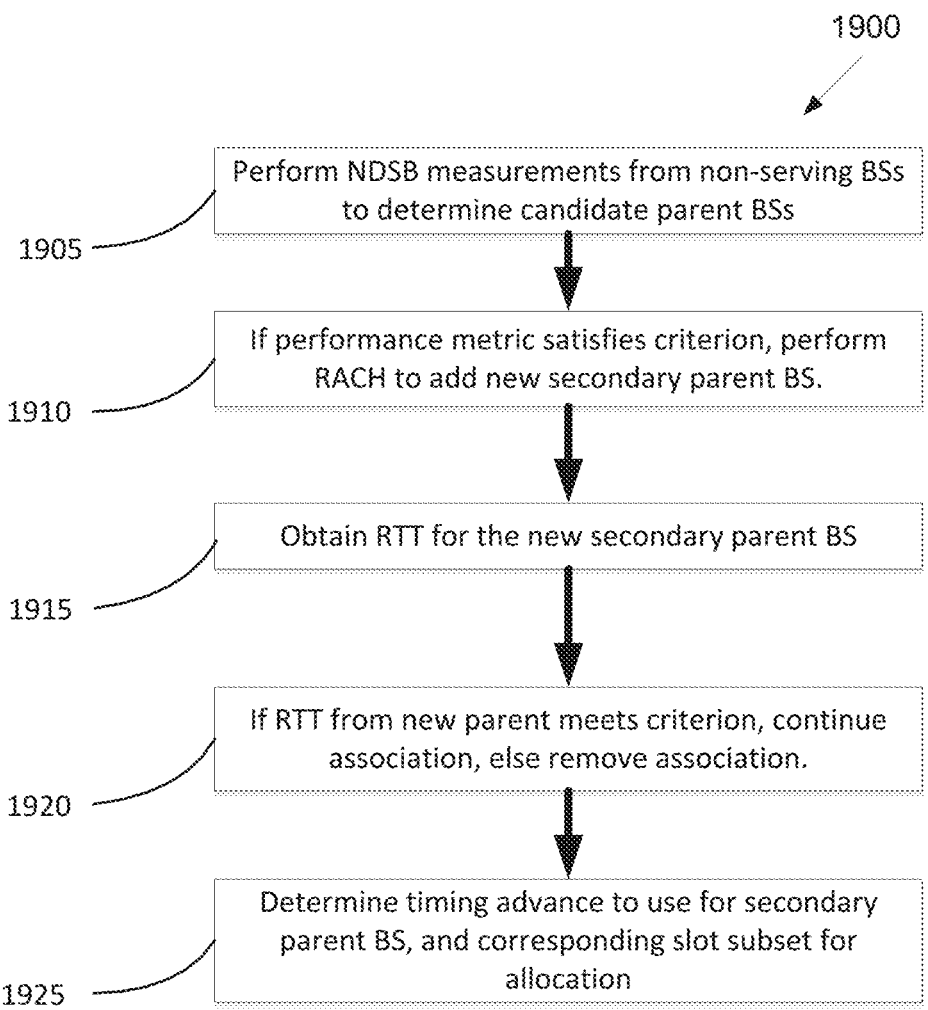
FIG. 19 illustrates a flowchart of a method for adding a secondary parent BS based on the guard time constraint on RTT only according to embodiments of the present disclosure.

FIG. 19 illustrates a flowchart of a method 1900 for adding a secondary parent BS based on the guard time constraint on RTT only according to embodiments of the present disclosure, as may be performed by a base station (e.g., 101-103 as illustrated in FIG. 1). The embodiment of the method 1900 illustrated in FIG. 19 is for illustration only. FIG. 19 does not limit the scope of the present disclosure to any particular implementation. In one embodiment, the method 1900 may be performed by child mesh BS 1204 illustrated in FIG. 12.

In various embodiments, a candidate parent BS can be added as a secondary parent BS as long as $T_{GT}-C>RTT_2$, independent of the timing offset of the candidate parent from the primary parent BS: $\Delta T$. In this case, the transmission slot timing obtained from the primary parent BS may be followed by the child BS to serve access links and child links. However, while transmitting to the secondary parent BS, the child BS may use a timing advance so that the transmitted packets align with the timing of the secondary parent BS. To ensure that such timing advancement does not conflict with the transmission pattern of the child BS, only regions with contiguous Tx slots may be allocated to a secondary parent BS.

FIG. 19 illustrates an example a method 1900 for adding a secondary parent BS based on such a guard time constraint on RTT avoidance of transmission pattern conflict with the secondary parent BS. In operations 1905 and 1910, the child mesh BS performs NDSB measurements, metric evaluation, and adds the secondary parent BS as discussed above, for example, with regard to FIGS. 13B and 13C. Thereafter, the child mesh BS obtains the RTT for the secondary parent BS for evaluation (operation 1915) and evaluates the RTT against the criterion (e.g., $T_{GT}-C>RTT_2$ as discussed above) and if meeting the criterion, continues the association with the secondary parent BS (operation 1920). Thereafter, the child mesh BS determines timing advance to use for secondary parent BS, and corresponding slot subset for allocation (operation 1925), for example, as illustrated by the example given in FIG. 18.

For example, to transmit an uplink signal for slot i at a secondary parent BS, the child BS may have to transmit a timing advanced signal that overlaps with up to two adjacent slots j,j+1 where j∈{i−1, i, i+1}. This is illustrated in FIG. 18, where i=4 and j=4. Thus, to prevent conflict with the slots for the primary parent BS, the slot i is allocated to the secondary parent BS for uplink reception only if the two slots j,j+1 are both of resource type hTx. This is illustrated for slot i=4 in FIG. 18, where for convenience, it may be assumed that there is no propagation time between the BSs. Similarly, since the transmitted downlink signal for slot i from the secondary parent BS is not aligned with the slots timing of the child BS, the corresponding received signal may overlap multiple slots at the child BS j,j+1 where j∈{i−1, i, i+1}. This is illustrated pictorially in FIG. 18 where i=j=1. Thus to prevent conflict with the slots corresponding to the primary parent BS, the child slot i may be allocated to the secondary parent BS for downlink transmission only if the two slots j,j+1 are both of resource type hRx, as illustrated for slot i=1 in FIG. 18.

These slots used for communicating with the secondary BS can be determined by the child BS and can be shared with the parent BSs via a slot/resource grant mechanism. In one embodiment, the child mesh BS informs the slots that the child mesh BS may use for communicating with certain parent BS and may not be able to communicate with other parent BSs. By doing so, the other parent BSs can avoid sending/scheduling data to the child mesh BS while the child mesh BS is unable to decode or execute the grant.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A base station (BS) in a wireless communication network, the BS comprising:
   a transceiver configured to:
      receive, from a first parent BS, information indicating a slot pattern of the BS, the slot pattern indicating slots on which the BS can receive and slots on which the BS can transmit; and
      receive discovery information about a neighbor BS in the wireless communication network; and
   a processor operably connected to the transceiver, the processor configured to:
      determine whether to add the neighbor BS as a second parent BS of the BS based on:
      the discovery information about the neighbor BS and one of:
         comparison of a timing offset to a threshold,
         a function of a round trip time (RTT), or
         a guard time between slots; and
      determine a resource allocation to the second parent BS based on the slot pattern of the BS,
   wherein the transceiver is further configured to communicate with the second parent BS based on the determined resource allocation.

2. The BS of claim 1, wherein:
   the transceiver is configured to receive, from the first parent BS, information indicating a slot pattern of the first parent BS,
   the processor is configured to determine the resource allocation to the second parent BS based on the slot pattern of the BS and the slot pattern of the first parent BS, and
   the transceiver is configured to transmit, to the second parent BS, information indicating the resource allocation to the second parent BS.

3. The BS of claim 2, wherein in determining the resource allocation to the second parent BS, the processor is further configured to:
   assign slots from the slot pattern of the BS that are compatible with the slot pattern of the first parent BS to the first parent BS; and
   assign remaining slots from the slot pattern of the BS to the second parent BS as the resource allocation to the second parent BS.

4. The BS of claim 2, wherein:
   the slot pattern comprises (i) hard slots where one of transmission, reception, or both transmission and reception is unconditionally available for the BS to use in uplink and downlink directions and (ii) soft slots where one of the transmission, reception or both transmission and reception is conditionally available for the BS to use in uplink and downlink directions subject to confirmation from the first parent BS, and
   in determining the resource allocation to the second parent BS, the processor is configured to determine to share only resources for the hard slots from the slot pattern with the first parent BS and the second parent BS and to use resources for the soft slots from the slot pattern with the first parent BS.

5. The BS of claim 2, wherein:
the second parent BS is one of multiple second parent BSs, and
in determining the resource allocation to the second parent BS, the processor is further configured to:
assign slots from the slot pattern of the BS that are compatible with the slot pattern of the first parent BS to the first parent BS; and
assign remaining slots from the slot pattern of the BS to one of the multiple second parent BSs, respectively, according to a preference order for a type of the respective remaining slot, wherein the preference order for each slot is determined based on a slot type of the BS and a slot type of the second parent BSs.

6. The BS of claim 1, wherein:
the first and second parent B Ss are two of a plurality of parent B Ss of the B S;
the processor is further configured to determine a resource allocation to each of the plurality of parent BSs based on the slot pattern of the BS and slot patterns of the plurality of parent BSs; and
the transceiver is configured to:
transmit, to the first parent BS, information indicating the resource allocation to the first parent BS; and
transmit, to the second parent BS, information indicating the resource allocation to the second parent BS.

7. The BS of claim 1, wherein:
the transceiver is further configured to receive information indicating a slot timing of a child BS of the BS; and
the processor is further configured to:
determine a timing advance to use for downlink transmissions to the child BS based on the received information; and
adjust transmission timing to align the downlink transmissions to the child BS with the slot timing of the child BS.

8. The BS of claim 1, wherein the processor is further configured to:
identify timing information for slots of the first parent BS; and
use guard times and timing advances to avoid transmission slots overlapping with reception slots.

9. The BS of claim 1, wherein the processor is further configured to:
identify a timing offset for slots of the neighbor BS relative to a timing of slots of the BS; and
identify the RTT for communication with the neighbor BS.

10. The BS of claim 1, wherein the processor is further configured to:
identify the RTT for communication with the neighbor BS;
determine whether to add the neighbor BS as the second parent BS of the BS as the function of the RTT and the guard time between slots; and
determine the resource allocation to the second parent BS based on a timing offset for slots of the second parent BS relative to a timing of slots of the B S, the slot pattern of the B S, and the slot pattern of the second parent BS.

11. A method of operating a base station (BS) in a wireless communication network, the method comprising:
receiving, from a first parent BS, information indicating a slot pattern of the BS, the slot pattern indicating slots on which the BS can receive and slots on which the BS can transmit;
receiving discovery information about a neighbor BS in the wireless communication network;
determining whether to add the neighbor BS as a second parent BS of the BS based on:
the discovery information about the neighbor BS and one of:
comparison of a timing offset to a threshold,
a function of a round trip time (RTT), or
a guard time between slots;
determining a resource allocation to the second parent BS based on the slot pattern of the BS; and
communicating with the second parent BS based on the determined resource allocation.

12. The method of claim 11, further comprising:
receiving, from the first parent BS, information indicating the slot pattern of the BS and information indicating a slot pattern of the first parent BS;
determining the resource allocation to the second parent BS based on the slot pattern of the BS and the slot pattern of the first parent BS; and
transmitting, to the second parent BS, information indicating the resource allocation to the second parent BS.

13. The method of claim 12, wherein determining the resource allocation to the second parent BS comprises:
assigning slots from the slot pattern of the BS that are compatible with the slot pattern of the first parent BS to the first parent BS; and
assigning remaining slots from the slot pattern of the BS to the second parent BS as the resource allocation to the second parent BS.

14. The method of claim 12, wherein:
the slot pattern comprises (i) hard slots where one of transmission, reception, or both transmission and reception is unconditionally available for the BS to use in uplink and downlink directions and (ii) soft slots where one of the transmission, reception or both transmission and reception is conditionally available for the BS to use in uplink and downlink directions subject to confirmation from the first parent BS, and
determining the resource allocation to the second parent BS comprises determining to share only resources for the hard slots from the slot pattern with the first parent BS and the second parent BS and to use resources for the soft slots from the slot pattern with the first parent BS.

15. The method of claim 12, wherein:
the second parent BS is one of multiple second parent BSs, and
determining the resource allocation to the second parent BS comprises:
assigning slots from the slot pattern of the BS that are compatible with the slot pattern of the first parent BS to the first parent BS; and
assigning remaining slots from the slot pattern of the BS to one of the multiple second parent BSs, respectively, according to a preference order for a type of the respective remaining slot, wherein the preference order for each slot is determined based on a slot type of the BS and a slot type of the second parent BSs.

16. The method of claim 11, wherein the first and second parent BSs are two of a plurality of parent BSs of the BS, the method further comprising:

determining a resource allocation to each of the plurality of parent BSs based on the slot pattern of the BS and slot patterns of the plurality of parent BSs;

transmitting, to the first parent BS, information indicating the resource allocation to the first parent BS; and transmitting, to the second parent BS, information indicating the resource allocation to the second parent BS.

17. The method of claim 11, further comprising:

receiving information indicating a slot timing of a child BS of the BS;

determining a timing advance to use for downlink transmissions to the child BS based on the received information; and adjusting transmission timing to align the downlink transmissions to the child BS with the slot timing of the child BS.

18. The method of claim 11, further comprising:

identifying timing information for slots of the first parent BS; and using guard times and timing advances to avoid transmission slots overlapping with reception slots.

19. The method of claim 11, further comprising:

identifying a timing offset for slots of the neighbor BS relative to a timing of slots of the BS; and identifying the RTT for communication with the neighbor BS.

20. The method of claim 11, further comprising:

identifying the RTT for communication with the neighbor BS;

determining whether to add the neighbor BS as the second parent BS of the BS as the function of the RTT and the guard time between slots; and determining the resource allocation to the second parent BS based on a timing offset for slots of the second parent BS relative to a timing of slots of the BS, the slot pattern of the BS, and the slot pattern of the second parent BS.

* * * * *